United States Patent
Steinbach et al.

(10) Patent No.: US 11,310,289 B2
(45) Date of Patent: Apr. 19, 2022

(54) SYSTEMS AND METHODS FOR GENERATING A SHORTCUT ASSOCIATED WITH A RICH COMMUNICATION SERVICES MESSAGING SESSION

(71) Applicant: Verizon Patent and Licensing Inc., Arlington, VA (US)

(72) Inventors: Lodema M. Steinbach, Clayton, CA (US); Sethumadhav Bendi, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

(21) Appl. No.: 16/011,246

(22) Filed: Jun. 18, 2018

(65) Prior Publication Data

US 2019/0387031 A1 Dec. 19, 2019

(51) Int. Cl.
| | | |
|---|---|---|
| *H04L 29/06* | (2006.01) | |
| *G06F 40/134* | (2020.01) | |
| *H04L 29/08* | (2006.01) | |
| *H04L 65/1066* | (2022.01) | |
| *H04L 65/10* | (2022.01) | |
| *H04L 69/24* | (2022.01) | |
| *H04L 67/02* | (2022.01) | |

(52) U.S. Cl.
CPC ........ *H04L 65/1066* (2013.01); *G06F 40/134* (2020.01); *H04L 65/1006* (2013.01); *H04L 69/24* (2013.01); *H04L 67/02* (2013.01)

(58) Field of Classification Search
CPC ........ G06F 9/44; G06F 3/0486; G06F 3/0482; G06F 40/134; H04L 65/1066; H04L 65/1006; H04L 69/24
See application file for complete search history.

(56) References Cited

U.S. PATENT DOCUMENTS

| | | | |
|---|---|---|---|
| 9,721,375 B1* | 8/2017 | Rivard | G06F 3/0346 |
| 2006/0277262 A1* | 12/2006 | Boss | H04L 51/04 |
| | | | 709/206 |
| 2016/0191432 A1* | 6/2016 | Panchapakesan | G06F 16/972 |
| | | | 709/206 |

(Continued)

OTHER PUBLICATIONS

Hay, Richard; "Quick Tip: How to Save Chats in Microsoft Teams"; Nov. 15, 2016; ITProToday; p. 1-3. (Year: 2016).*

(Continued)

*Primary Examiner* — Hitesh Patel
*Assistant Examiner* — Eui H Kim

(57) ABSTRACT

A user device may receive an instruction to generate a shortcut associated with a rich communication services (RCS) messaging session that is associated with a RCS application. The user device may generate, based on receiving the instruction, a snapshot of the RCS messaging session, and may transmit, based on generating the snapshot of the RCS messaging session, the snapshot of the RCS messaging session to an application server. The user device may generate, based on transmitting the snapshot of the RCS messaging session to the application server, the shortcut associated with the RCS messaging session, where the shortcut associated with the RCS messaging session is linked to the snapshot of the RCS messaging session. The user device may display, on a display of the device, the shortcut associated with the RCS messaging session.

20 Claims, 23 Drawing Sheets

(56) References Cited

U.S. PATENT DOCUMENTS

2017/0180276 A1* 6/2017 Gershony ............... H04L 51/16
2017/0366493 A1* 12/2017 Wilde .................. G06Q 10/101
2018/0302349 A1* 10/2018 Ban ........................ H04L 51/04

OTHER PUBLICATIONS

Pathak, Priya; "Now reply to Google Hangouts messages without opening app"; Jan. 28, 2016; IndiaToday. "https://www.indiatoday.in/technology/news/story/now-reply-to-google-hangouts-messages-without-opening-app-305889-2016-01-28" (Year : 2016).*

* cited by examiner

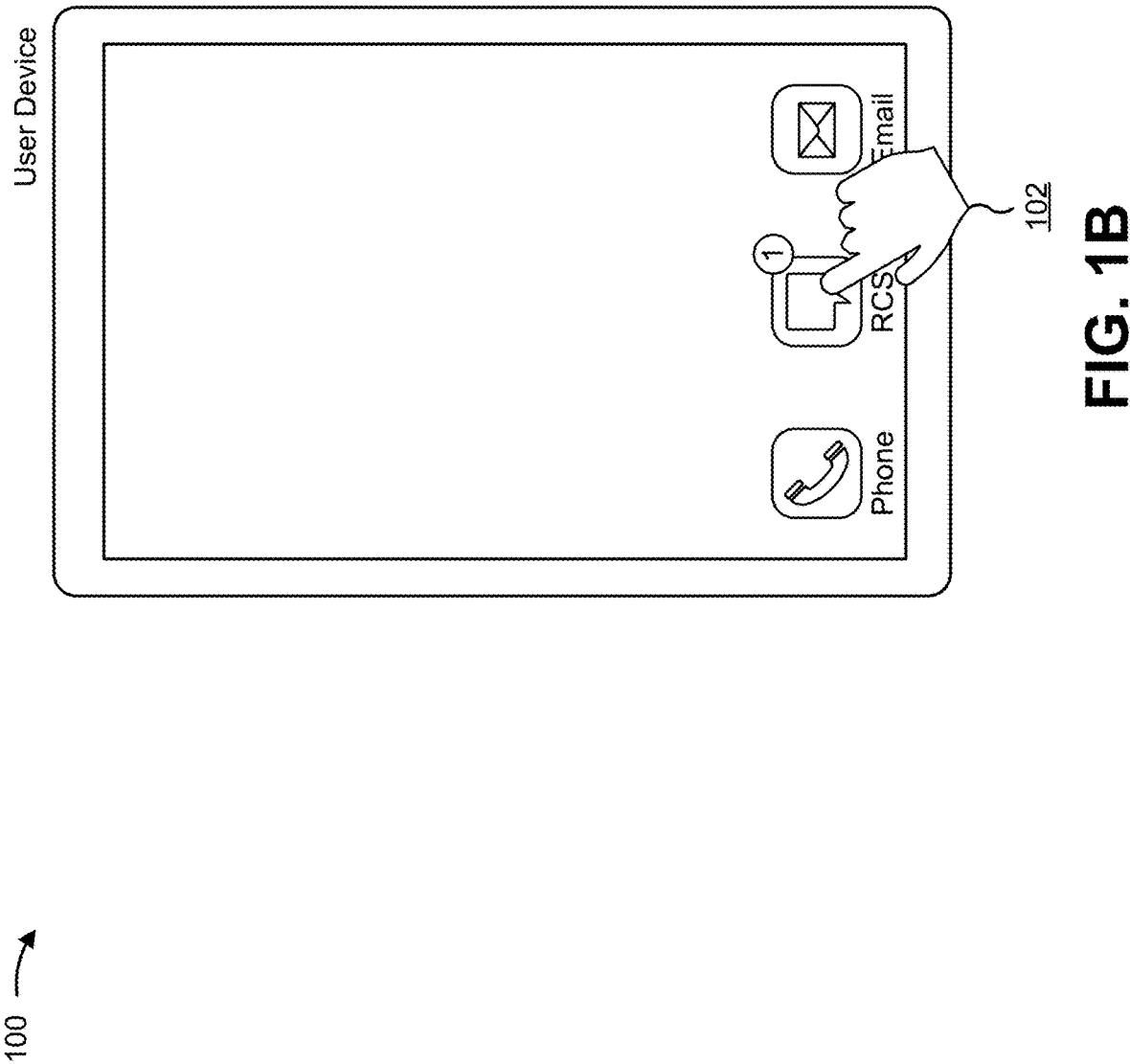

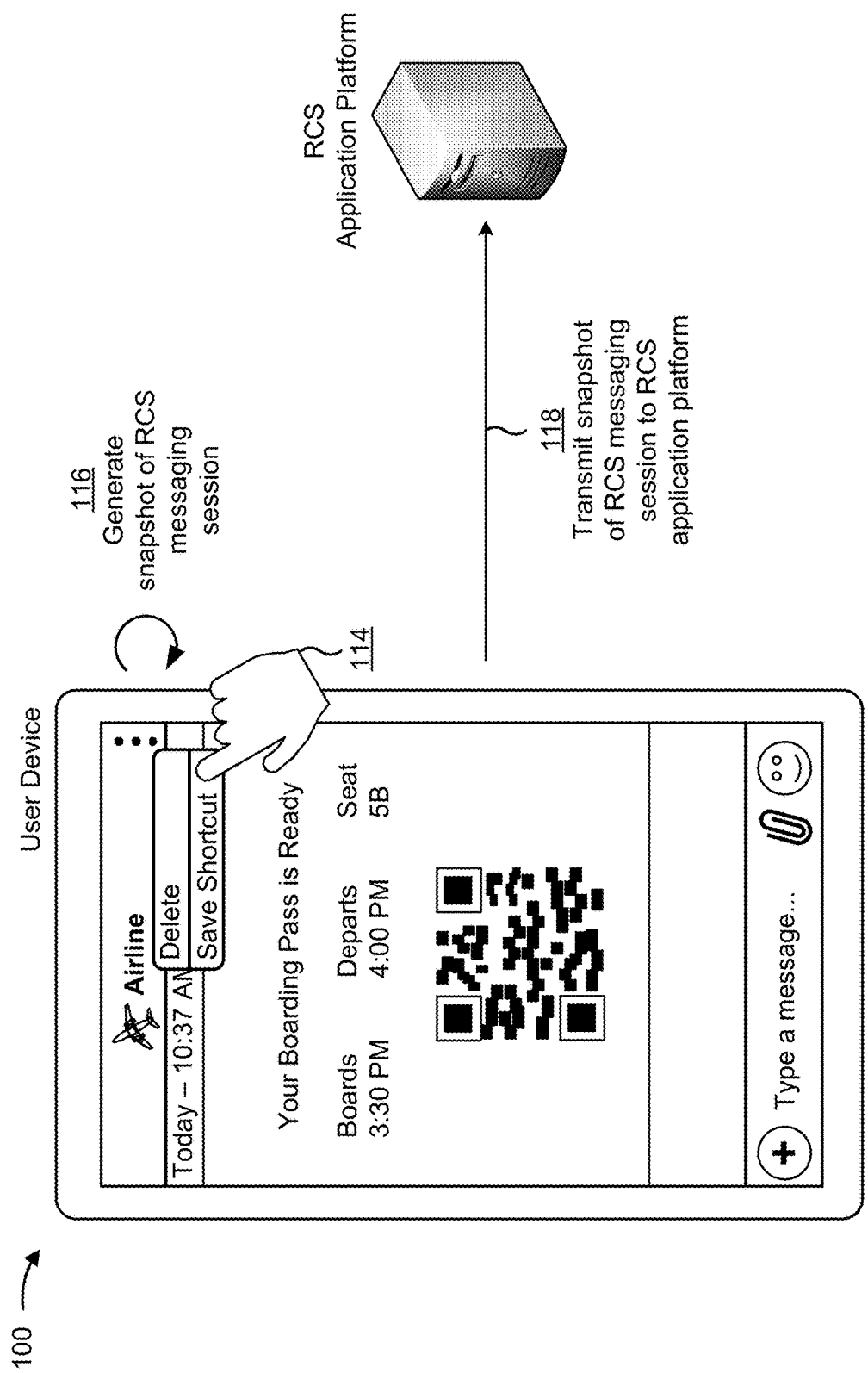

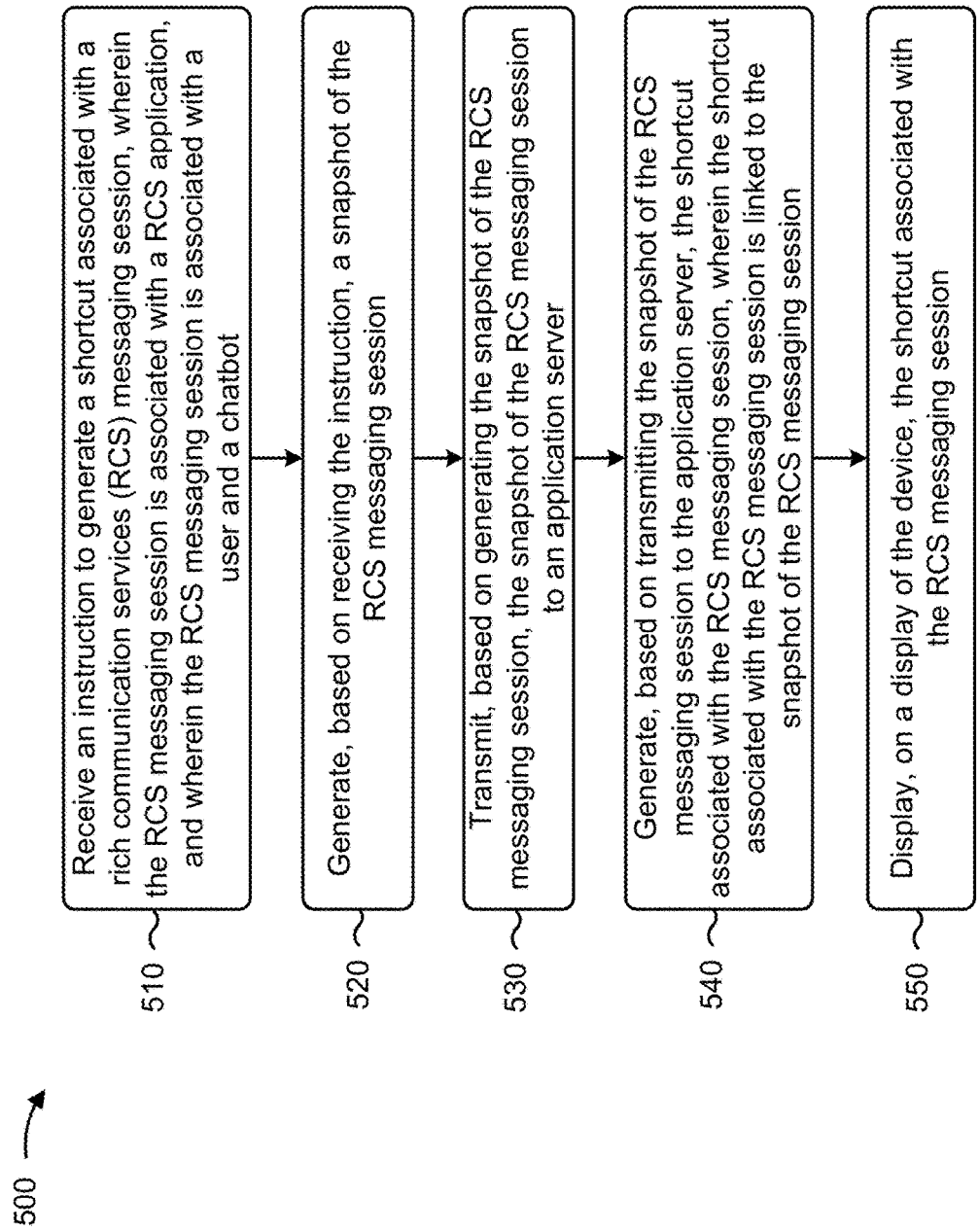

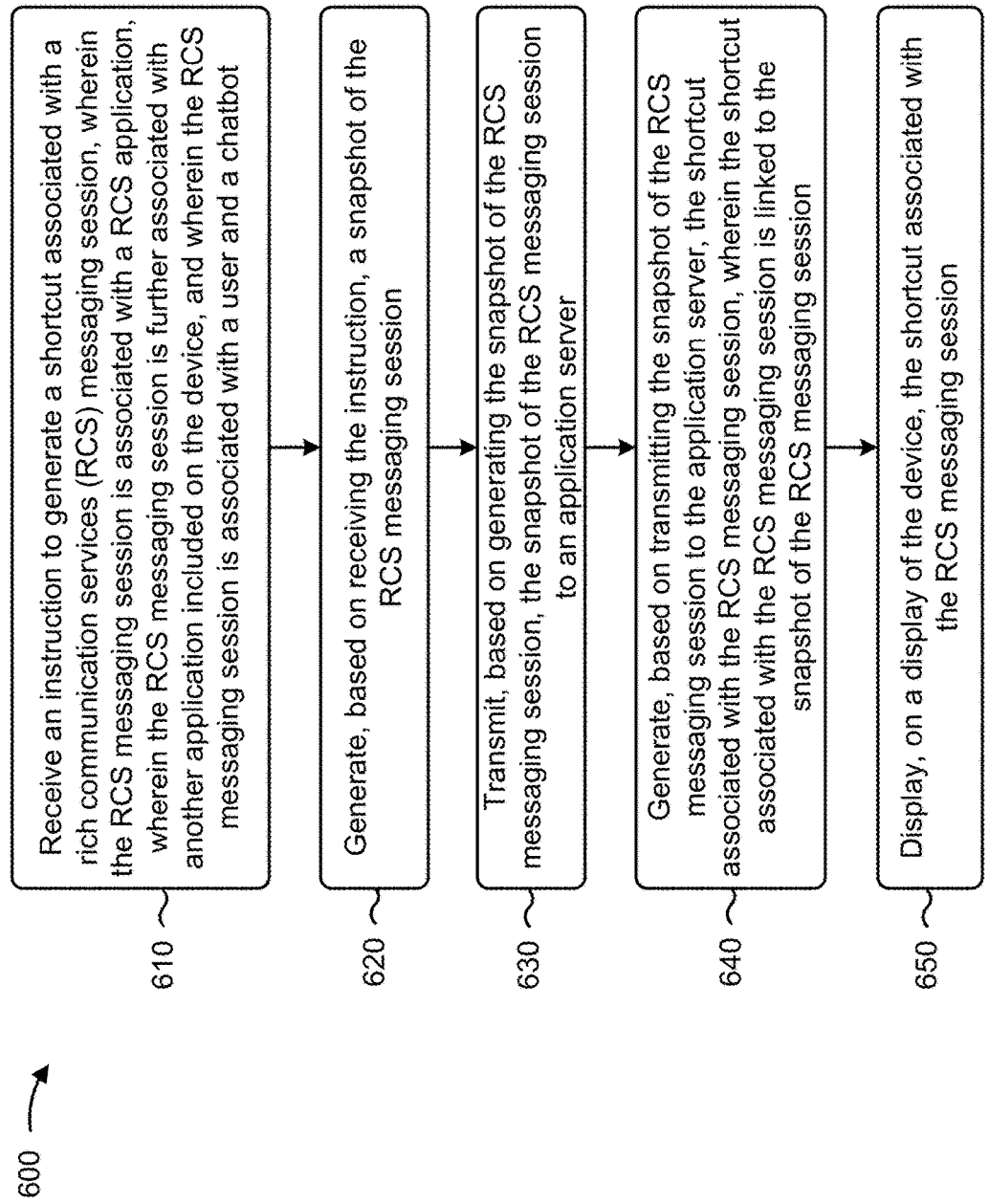

SYSTEMS AND METHODS FOR GENERATING A SHORTCUT ASSOCIATED WITH A RICH COMMUNICATION SERVICES MESSAGING SESSION

BACKGROUND

Rich communication services (RCS) messaging provides various enhancements to short messaging service (SMS) messaging, such as read receipts, multimedia (e.g., audio, video, picture, etc.) messaging, attachments, customized interactive objects, location sharing, group messaging sessions, and/or the like.

BRIEF DESCRIPTION OF THE DRAWINGS

FIG. 5 is a flow chart of an example process for generating a shortcut associated with a RCS messaging session.

FIG. 6 is a flow chart of an example process for generating a shortcut associated with a RCS messaging session.

DETAILED DESCRIPTION OF PREFERRED EMBODIMENTS

Figure 1A:
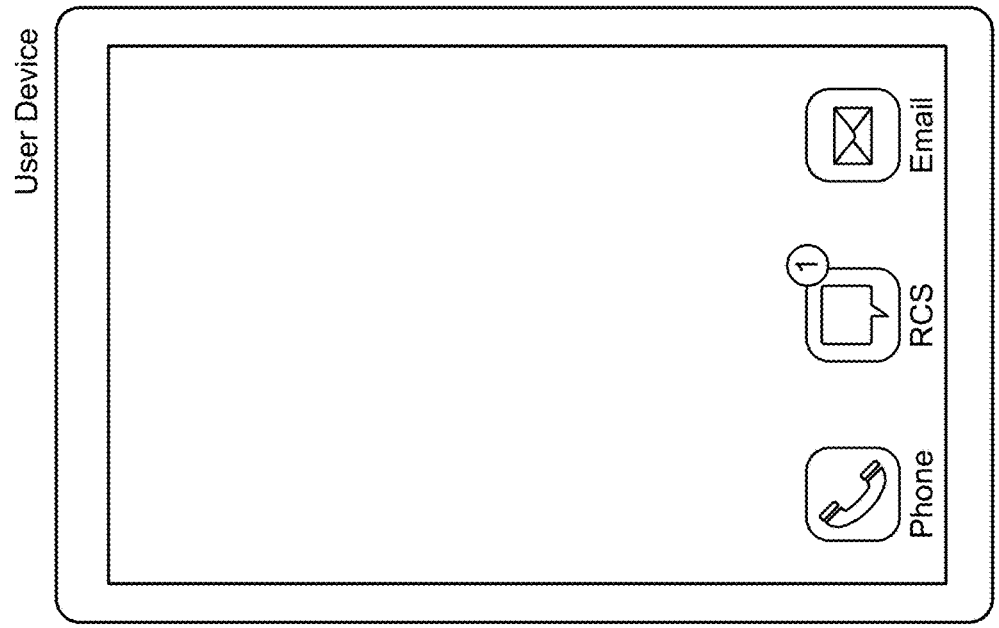
FIGS. 1A-1R are diagrams of an example implementation described herein.

The following detailed description of example implementations refers to the accompanying drawings. The same reference numbers in different drawings may identify the same or similar elements.

In some cases, an organization may use RCS messaging to provide services on a user device, which is sometimes referred to as messaging as a service (MaaS). For example, instead of providing a standalone application, the organization may provide a user of the user device with customer service and/or support, e-commerce functionality, account management functionality, and/or the like in a RCS messaging session using a RCS application on the user device. Accordingly, the organization may use the RCS application already provided on the device to provide services without having to design, build, and/or maintain a standalone application. However, the RCS application may lack some efficiencies of a standalone application. For example, the user may have to perform a plurality of actions in order to access the RCS messaging session between the user and the organization, whereas a user may access a standalone application associated with the organization on a home screen of a graphical user interface (GUI) of the user device with a single action. As another example, the user may have RCS messaging sessions initiated with a plurality of organizations, and it may be difficult to sort, filter, and browse through the RCS messaging sessions using the GUI of the user device to find a particular RCS messaging session.

Some implementations described herein provide a user device capable of generating a shortcut associated with a RCS messaging session. The user device may receive an instruction to generate the shortcut associated with the RCS messaging session, and may generate a snapshot for the RCS messaging session. The user device may transmit the snapshot to an application server associated with the RCS application, and may generate the shortcut, which may be linked to the snapshot of the RCS messaging session. The user device may display the shortcut on a display of the user device. In this way, the user device reduces the amount of storage resources associated with the user device that are used to store information associated with RCS messaging sessions. Moreover, in this way, the user device may back up a RCS messaging session onto the RCS application platform, which can be recalled by the user device if the RCS messaging session on the user device is corrupted or deleted. Further, in this way, the user device may resume the RCS messaging session from the snapshot of the RCS messaging session based on a single interaction (e.g., a single tap of the display of the user device) between the user and the user device. Still further, in this way, the user device reduces a quantity of interactions needed to resume a RCS messaging session, which simplifies the GUI of the user device, increases the efficiency of the GUI of the user device, and decreases the amount of processor and memory resource used to find and display the RCS messaging session.

Figure 1C:
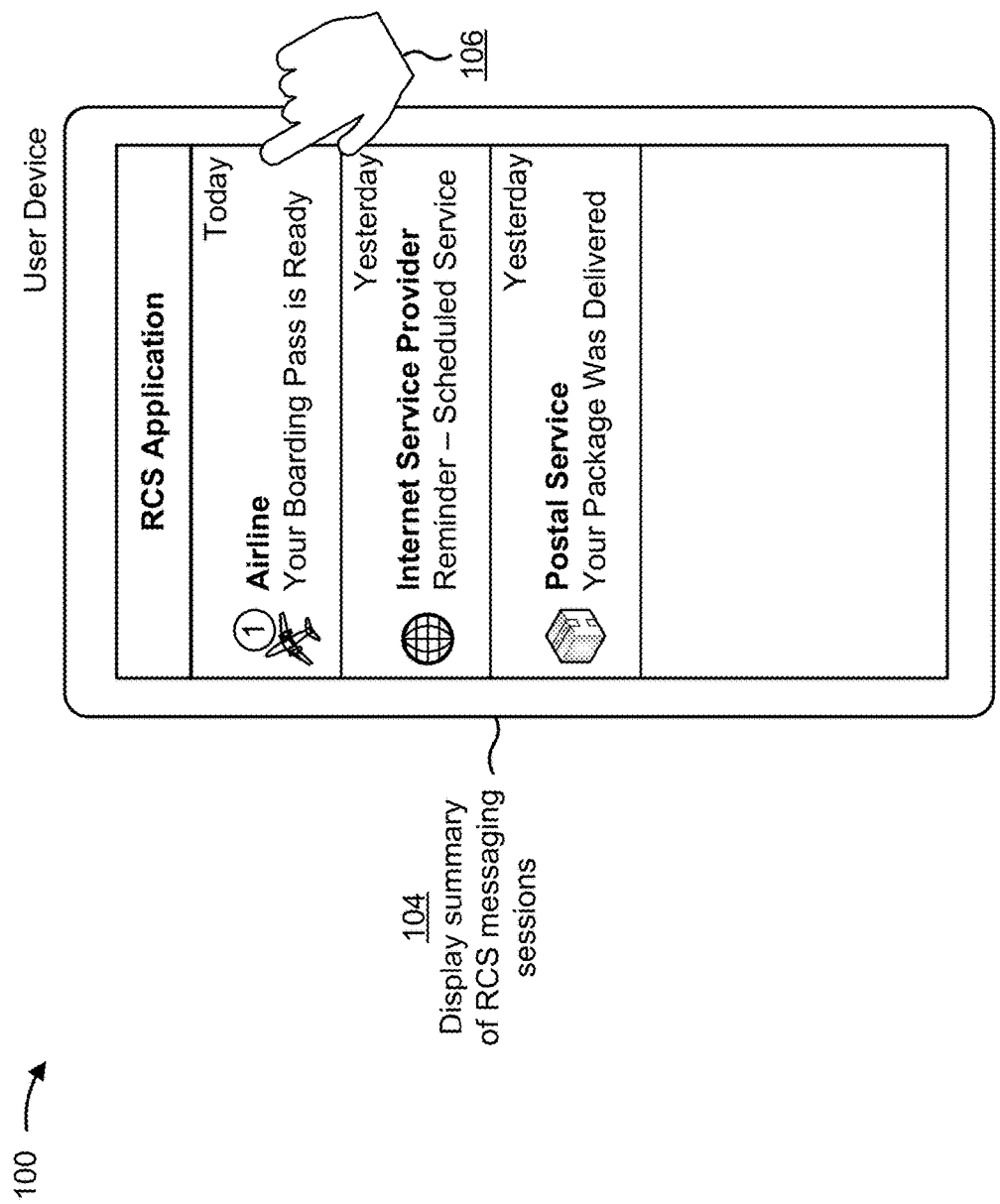
Figure 1D:
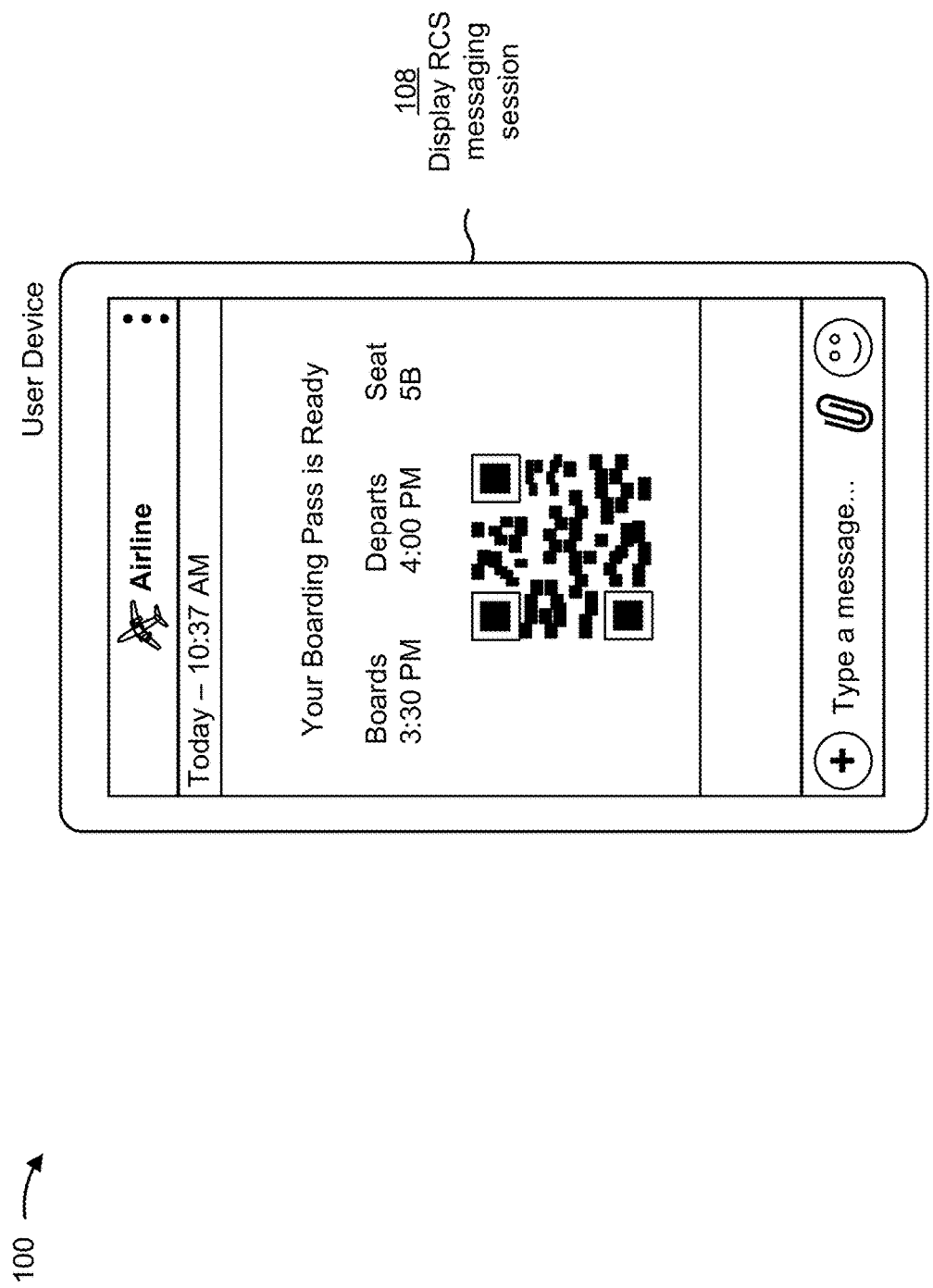
Figure 1E:
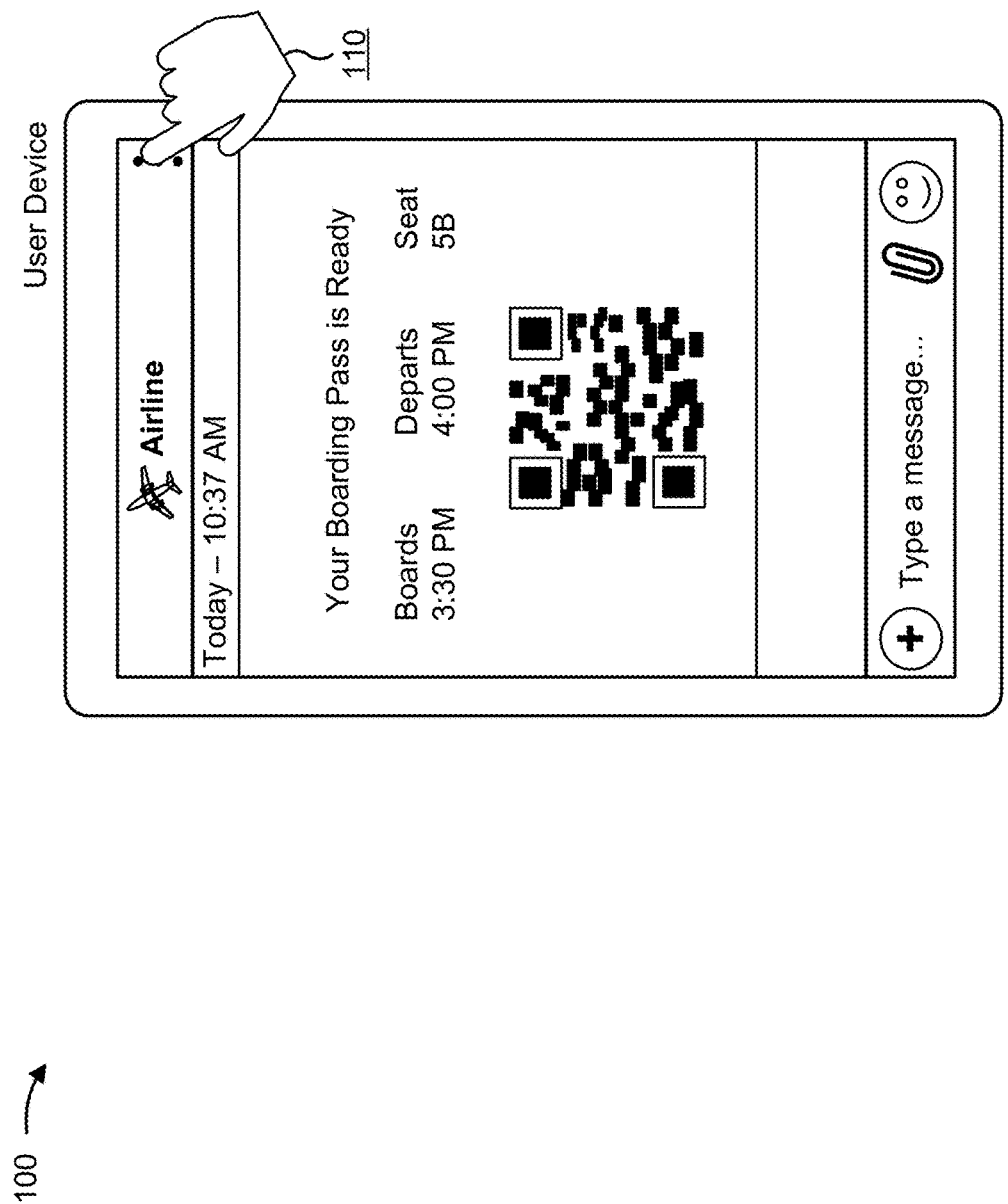
Figure 1F:
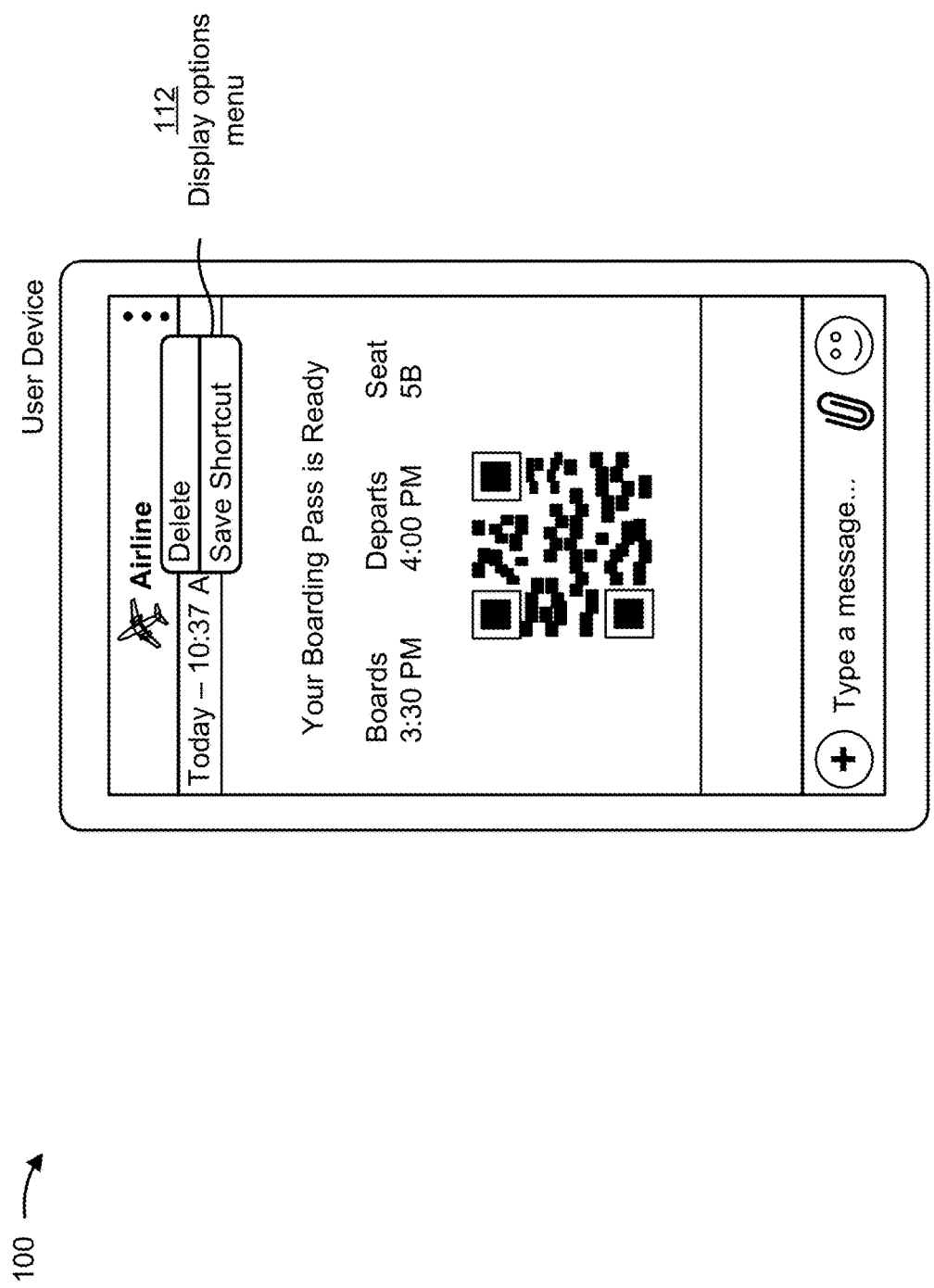
Figure 1H:
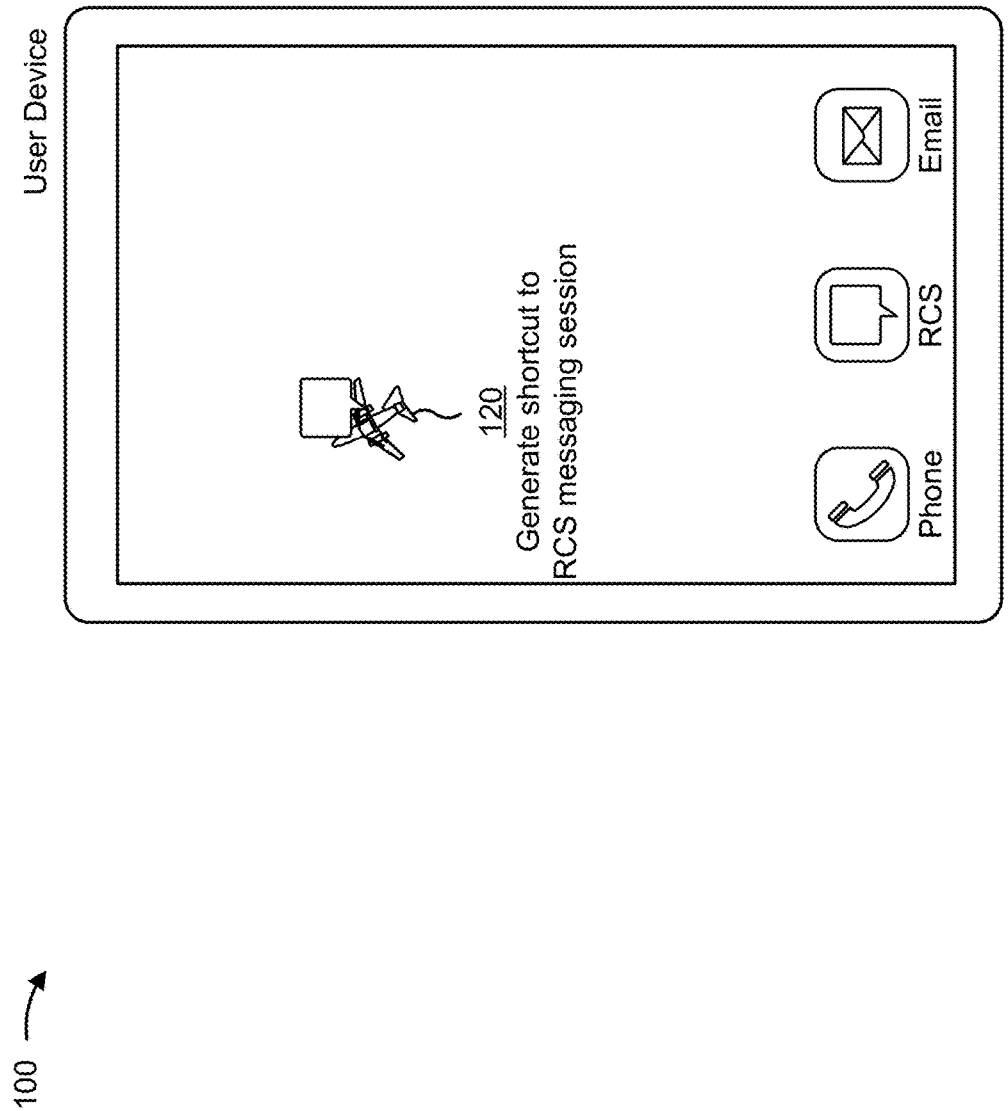
Figure 1I:
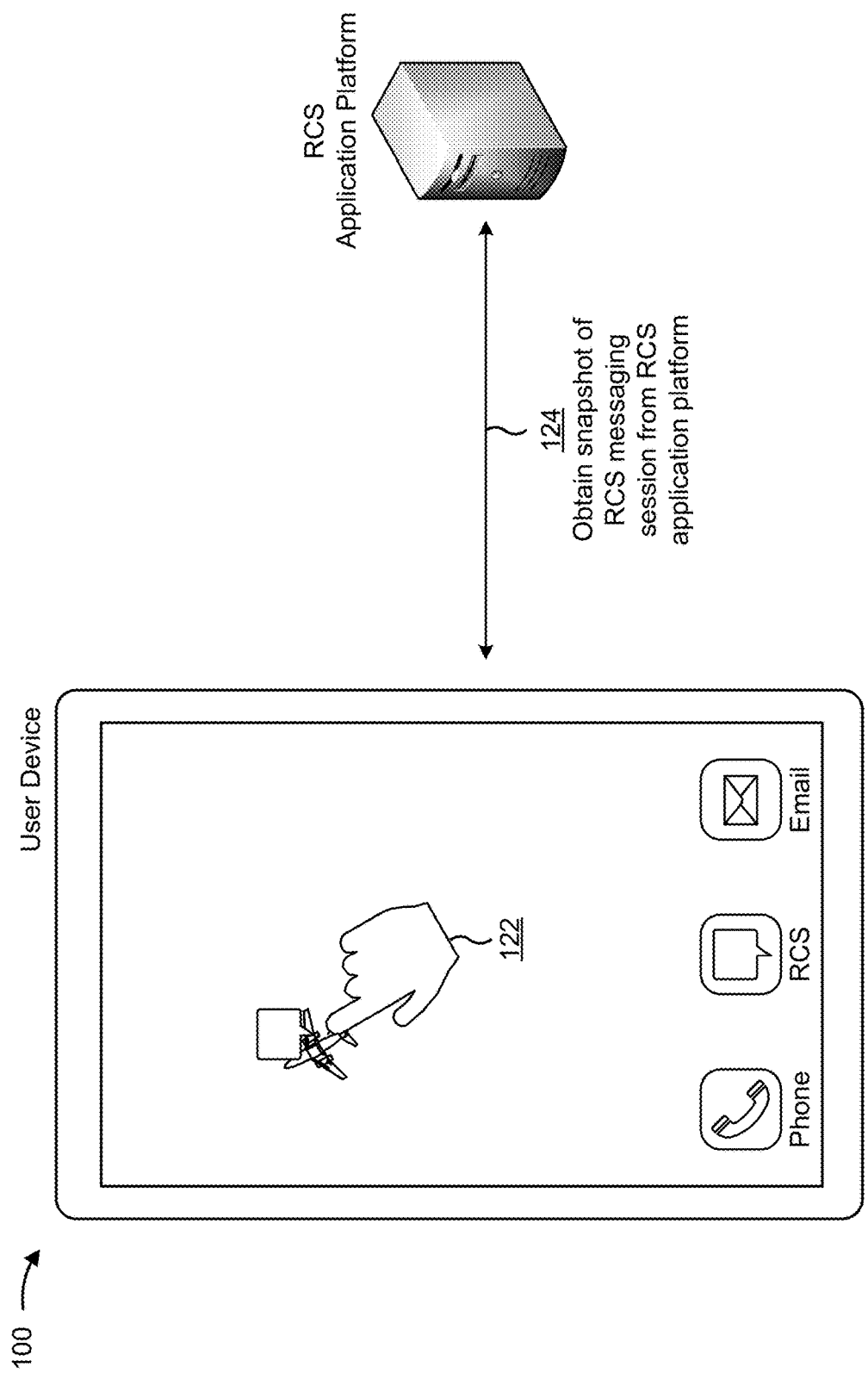
Figure 1J:
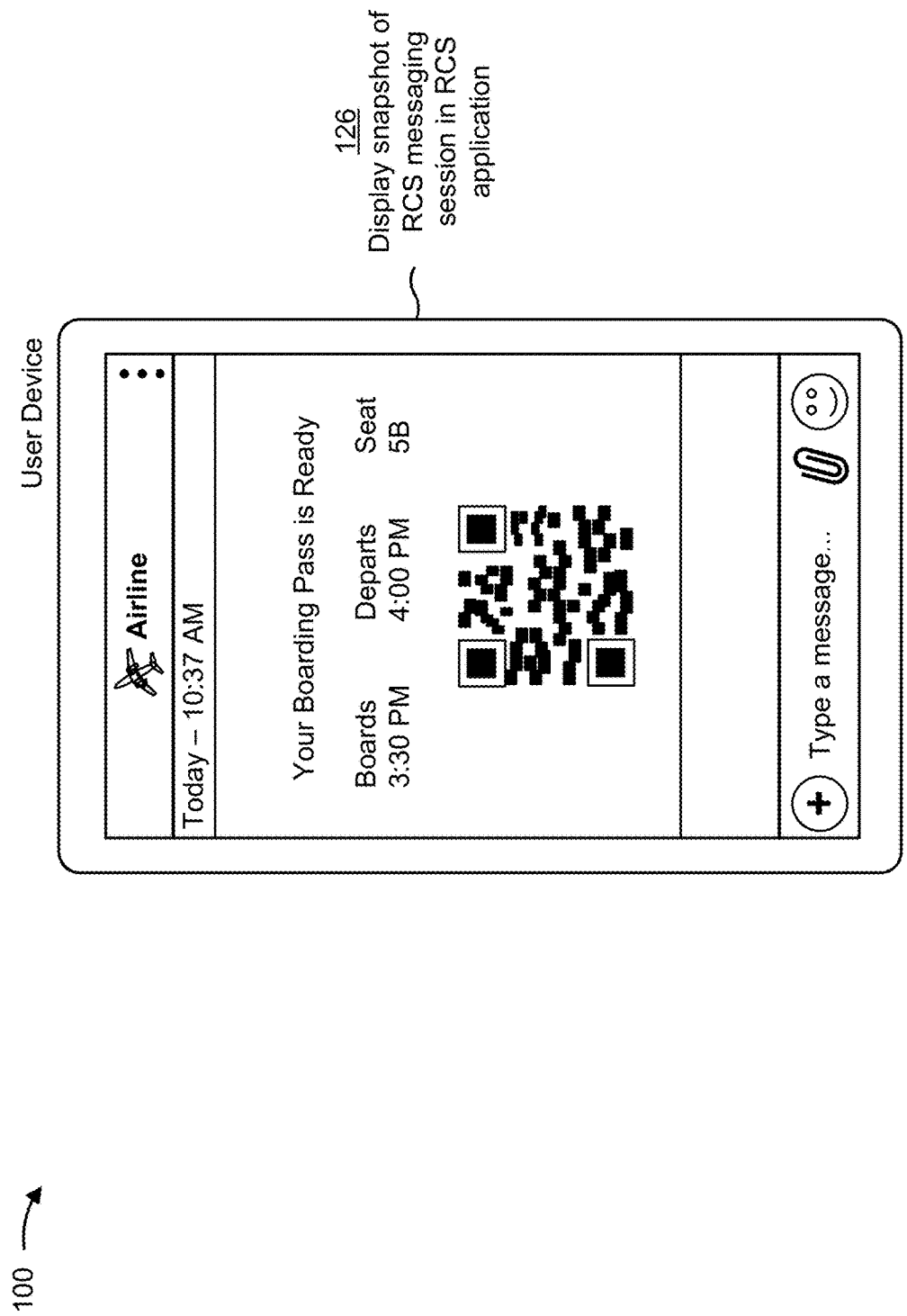
Figure 1K:
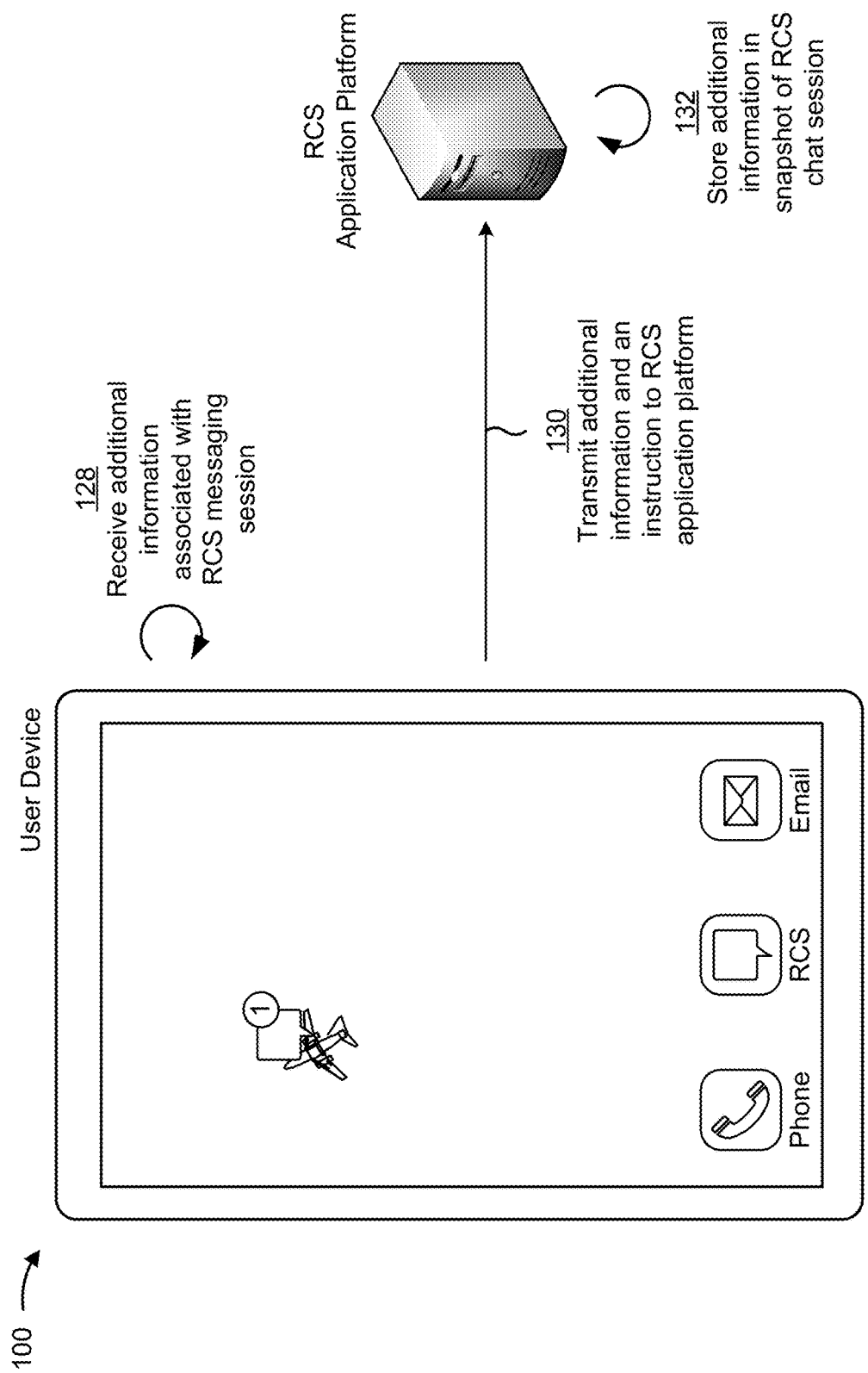
Figure 1L:
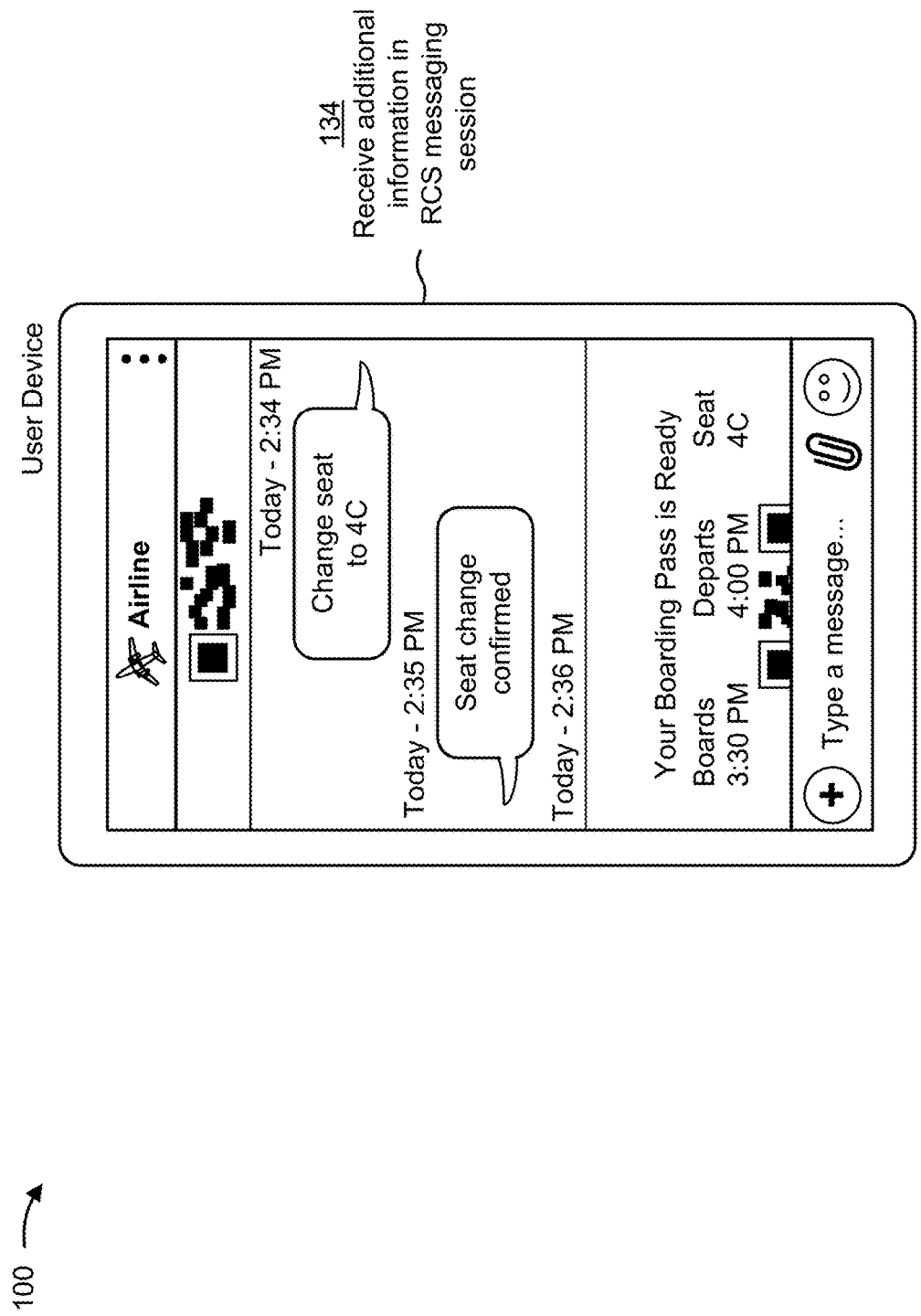
Figure 1M:
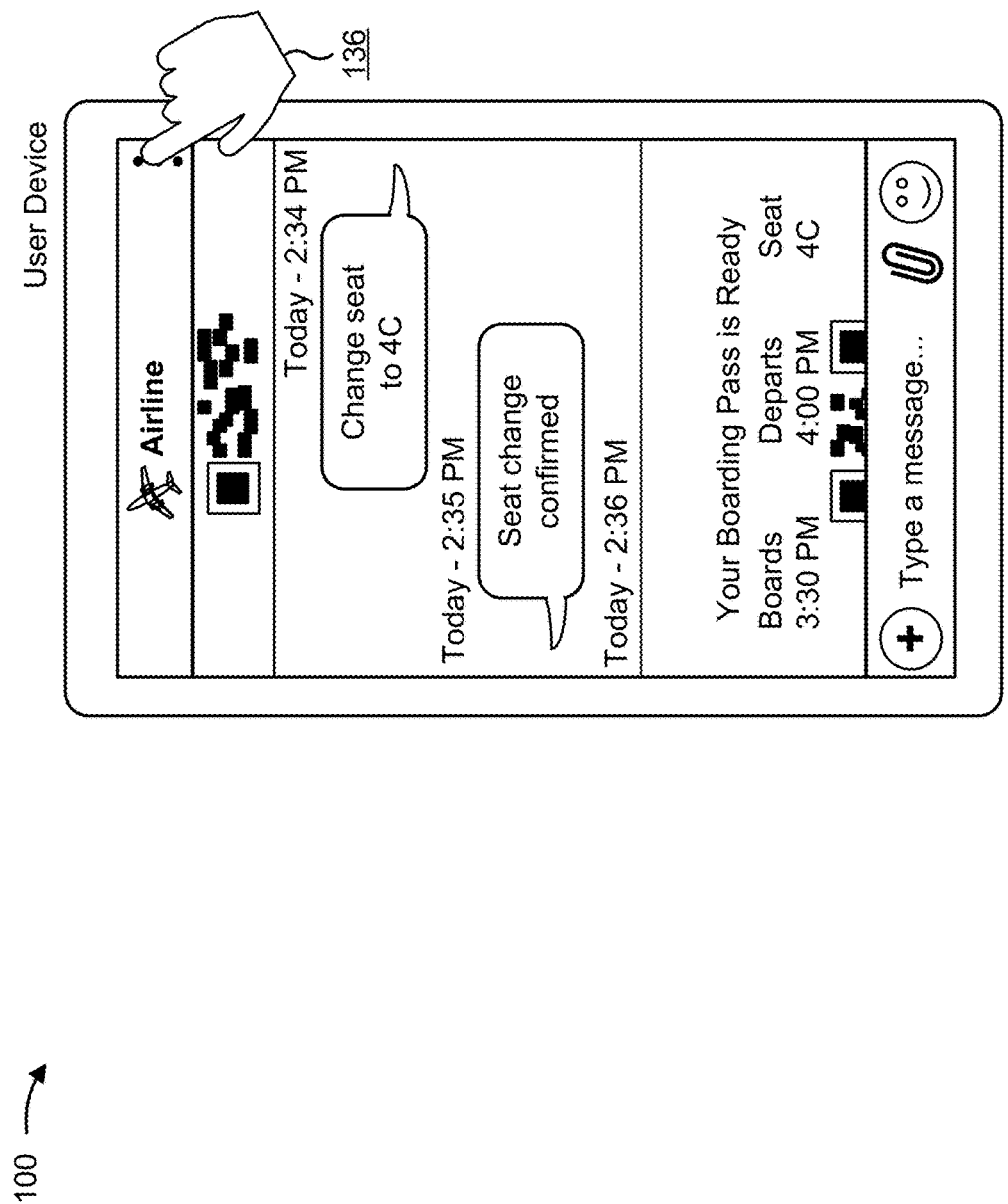
Figure 1N:
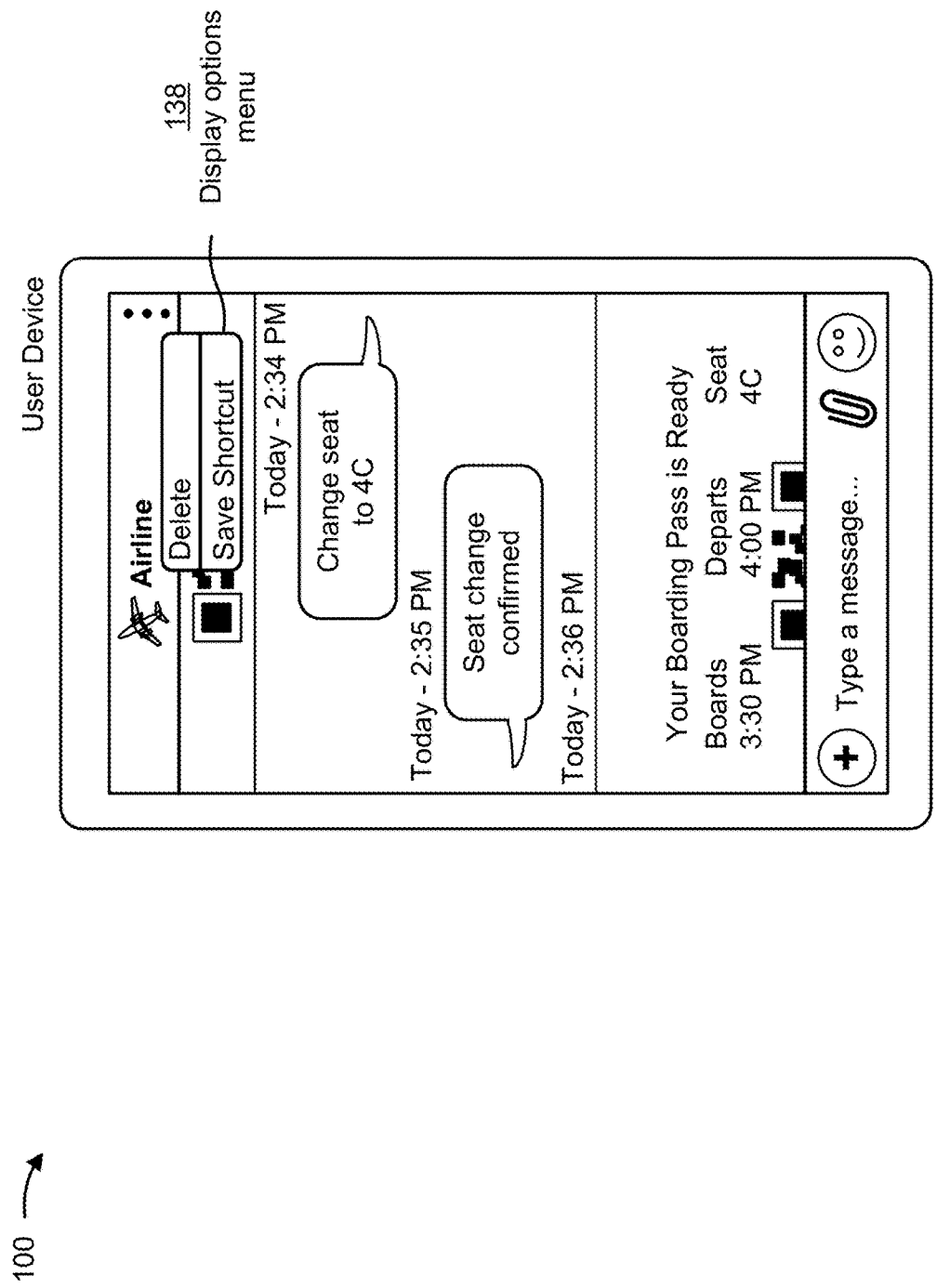
Figure 10:
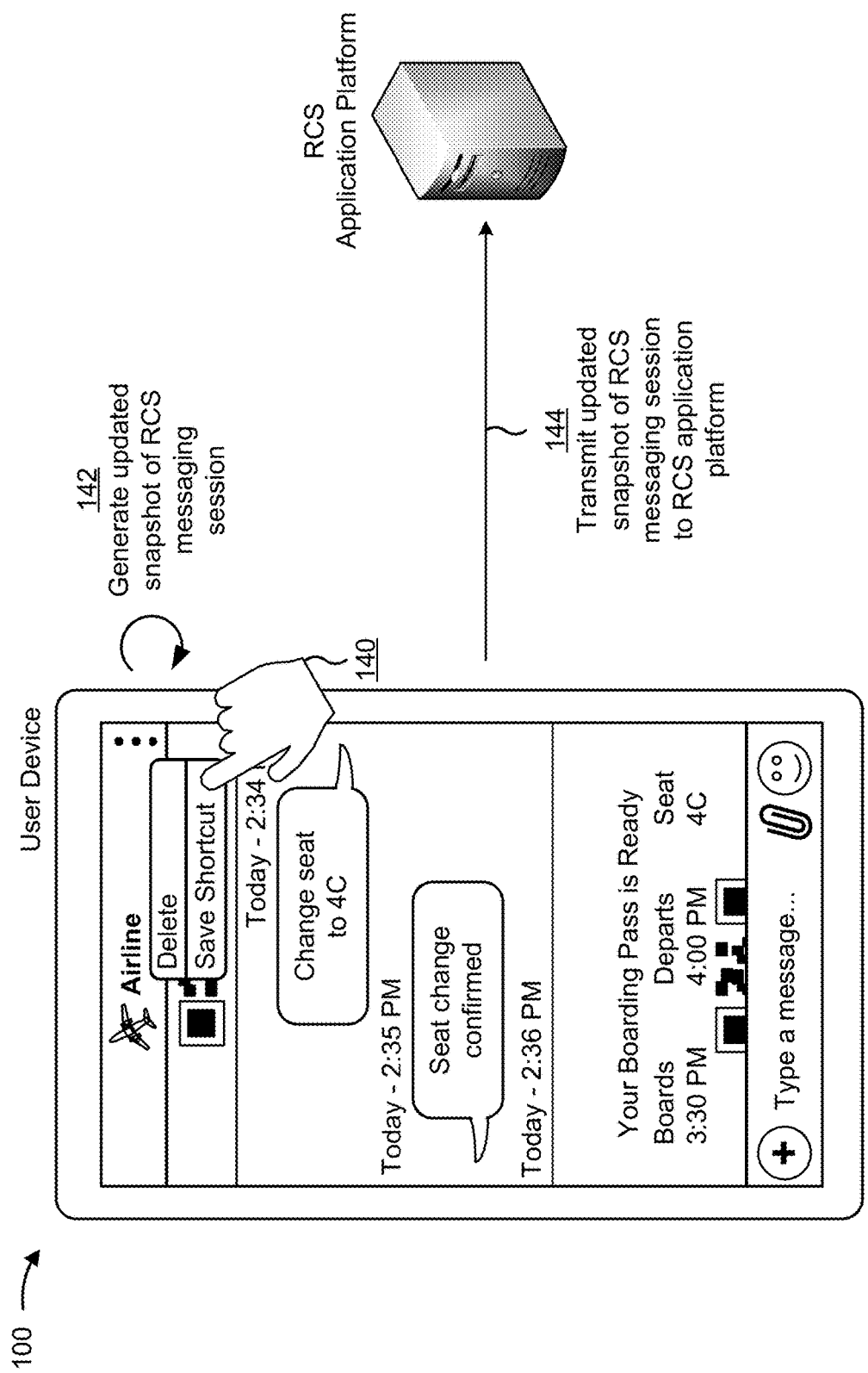
Figure 1P:
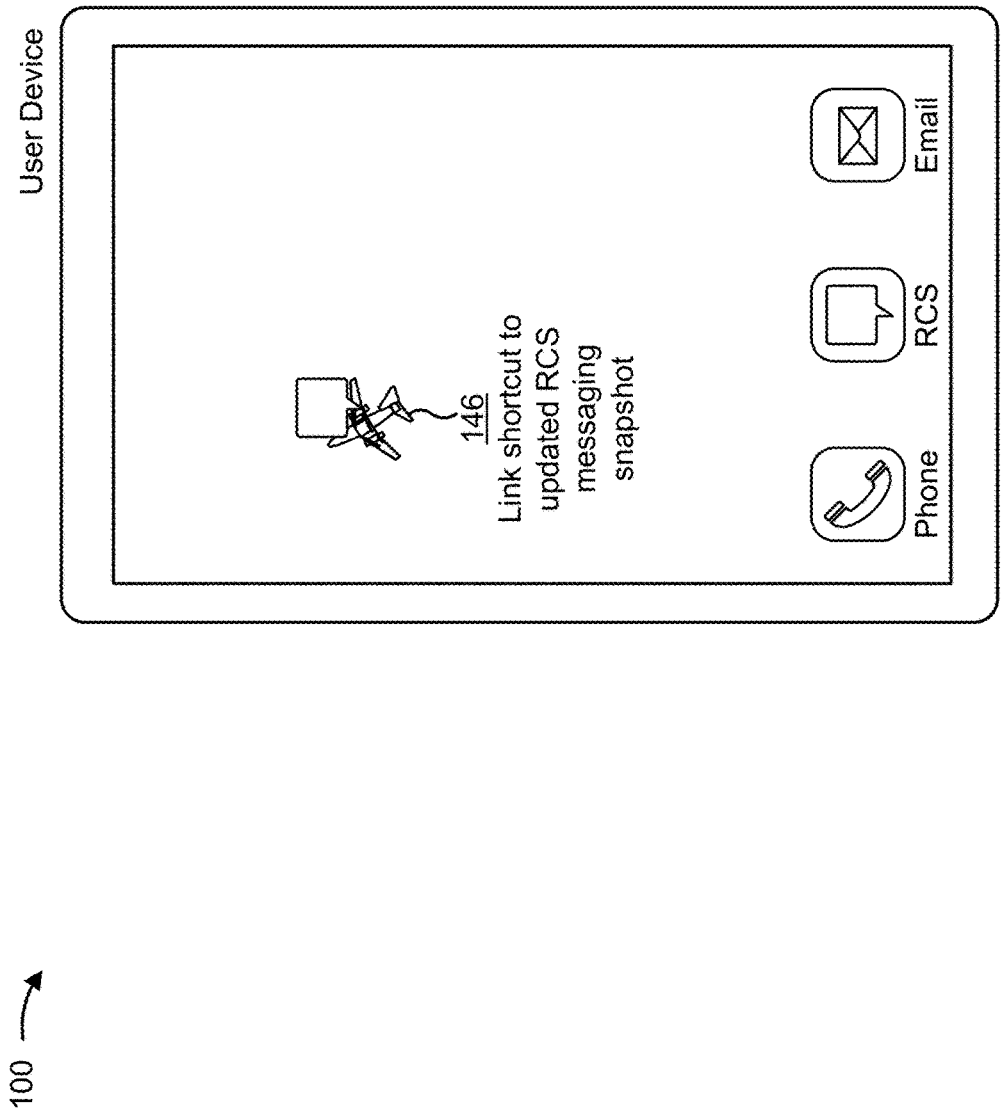
Figure 1Q:
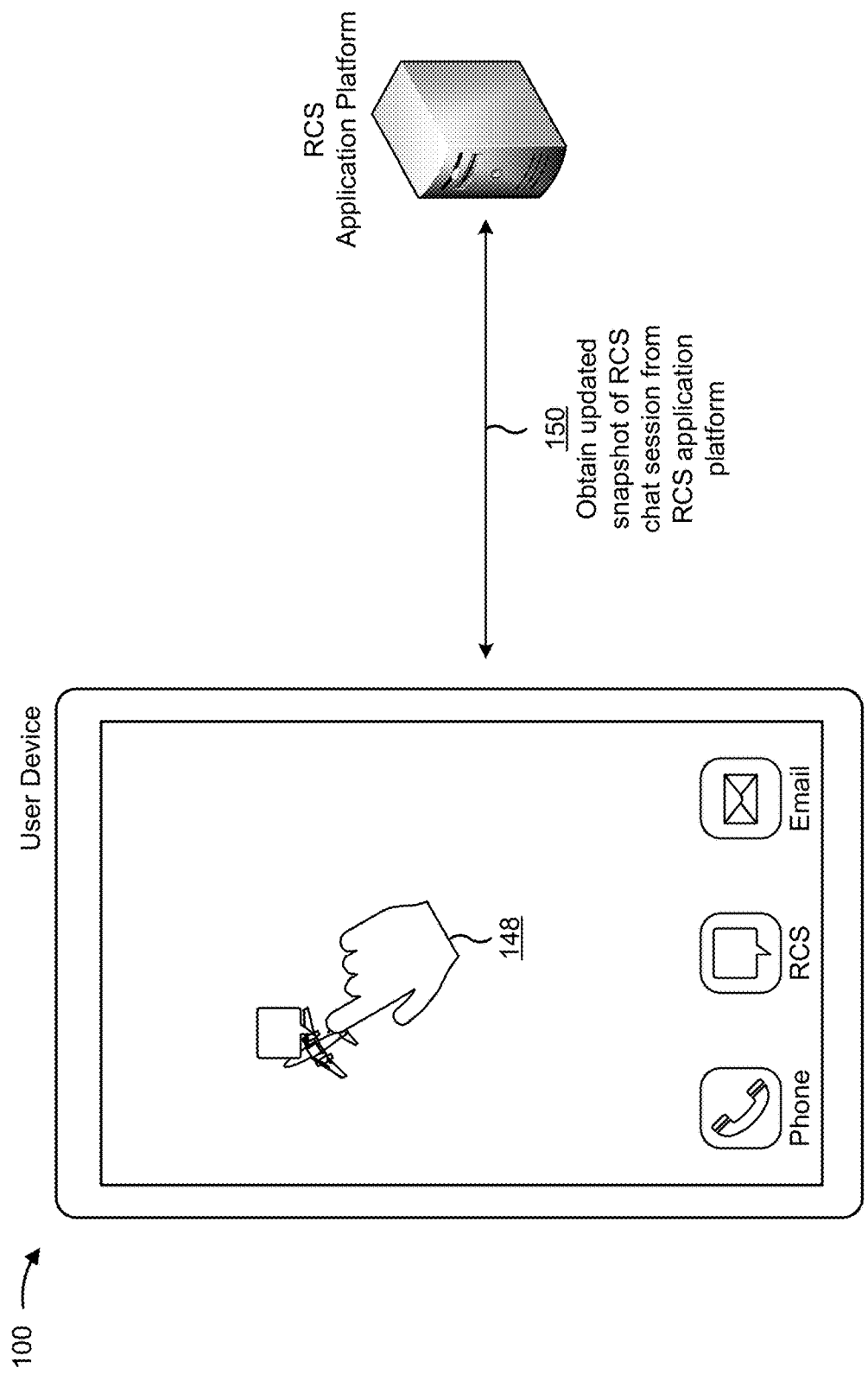
Figure 1R:
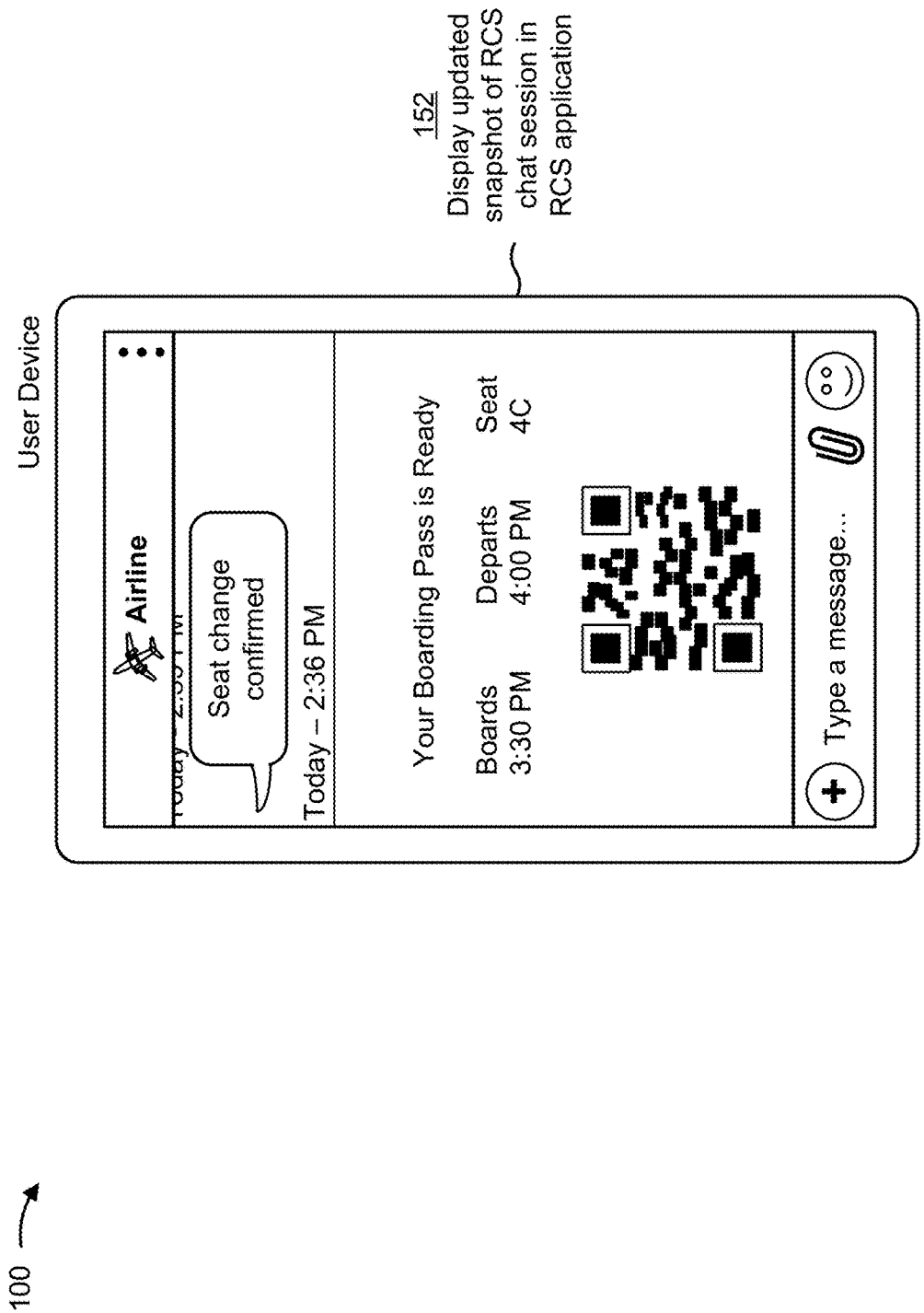

FIGS. 1A-1R are diagrams of an example implementation 100 described herein. As shown in FIGS. 1A-1R, implementations 100 may include a user device, a RCS application platform, and/or the like.

As shown in FIG. 1A, the user device may include one or more applications, such as a phone application (i.e., an application capable of making and answering phone calls using the user device), a RCS application, an email application, and/or the like. The RCS application may be an application that provides RCS messaging functionality on the user device. The RCS messaging functionality may include, for example, sending, receiving, displaying, and/or interacting with text-based messages, images, video messages, audio messages, attachments, interactive objects, and/or the like.

The RCS application may allow a user of the user device to communicate with another user of another device, to communicate with a user representative (e.g., a customer service representative), to communicate with an artificial intelligence (AI) messaging service such as a chatbot, and/or the like. In some implementations, a chatbot may be used for various purposes, such as to provide customer service and support, e-commerce, account management (e.g., for utilities such as electricity, Internet, telecommunications service, etc.), analytics, and/or the like. For example, an airline may provide a chatbot via the RCS application on the user device, and the user of the user device may interact with the chatbot to book a flight, check flight and/or check-in times, change a seat assignment, and/or the like.

In some implementations, the user device may display various notifications on a display of the user device. For example, and as shown in FIG. 1A, the user device may display a notification associated with the RCS application. The notification may indicate an event associated with the RCS application has occurred, such as an RCS message has been received and is unread, may indicate a quantity of received and unread RCS messages, and/or the like. In the example shown in FIG. 1A, the notification indicates that the user device has received one (1) new unread RCS message.

Turning now to FIG. 1B, and as shown by reference number 102, the user device may receive an input associated with an application on the user device. For example, the user device may receive the input in the form of the user of the user device interacting with an icon, associated with the RCS application, displayed on the display of the user device. In some implementations, if the user device is equipped with a touch screen, the user may interact with the icon associated with the RCS application by tapping a portion of the display that is displaying the RCS application icon to interact with the icon.

Turning now to FIG. 1C, and as shown by reference number 104, the user device may, based on receiving the input associated with the RCS application icon, launch the RCS application (if the RCS application is in an unlaunched state) and/or display the RCS application on the display of the user device. In some implementations, the user device may display a summary page, which may include one or more RCS messaging sessions and a summary of each RCS messaging session of the one or more RCS messaging sessions.

A summary of a RCS messaging session may include a subset of information associated with the RCS messaging session. The subset of information associated with the RCS messaging session may include an icon or avatar (e.g., an icon or avatar associated with the user, an icon or avatar associated with a party with which the user is communicating in the RCS messaging session, etc.), a name (e.g., a name associated with the user, a name associated with the party with which the user is communicating in the RCS messaging session, etc.), a date and/or time of day a most recent message in the RCS messaging session was received, the text (or a snippet of the text) included in the most recent message, a description of one or more types of content included in the most recent message (e.g., a description indicating that the most recent message includes an image, a video message, an audio message, an attachment, etc.), a notification (e.g., a notification indicating that there are new unread messages received in the RCS messaging session) and/or the like. As an example, a summary of a RCS messaging session between the user of the user device and an airline RCS-based chatbot (or an airline representative) may include an avatar or icon associated with the airline, the airline's name, a description indicating that a most recent message between the user and the airline includes an electronic boarding pass, a day the most recent message was received, and a notification indicating there is one new and unread message in the RCS messaging session.

As shown by reference number 106, the user device may receive an input associated with a summary of a RCS messaging session displayed on the display of the user device. For example, the user of the user device may interact with a summary of a RCS messaging session displayed on the display of the user device by tapping a portion of the touch screen display that is displaying the summary of the RCS messaging session associated with the airline chatbot or representative to interact with the summary.

Turning now to FIG. 1D, and as shown by reference number 108, the user device may display, on the display of the device, the RCS messaging session based on the user device receiving the input associated with the summary of the RCS messaging session. As shown in FIG. 1D, for example, the user device is displaying the RCS messaging session between the user of the user device and the airline chatbot or representative. The user device may display information associated with the RCS messaging session between the user of the user device and the airline chatbot or representative, such as an icon or avatar associated with the airline chatbot or representative and/or the user, a name associated with the airline chatbot or representative and/or user, one or more messages (e.g., a text message, an image message, an audio message, a video message, etc.) sent by the airline chatbot or representative and/or the user, a date and/or time of day the one or more messages was sent or received, a read receipt (e.g., information indicating whether a message has been read by the user or airline chatbot or representative and/or information indicating a date and/or time of day the message was read), an attachment (e.g., an electronic boarding pass associated with the airline), an interactive object (e.g., the airline chatbot or representative may send an interactive message including text asking the user if the user wants to change a seat assignment associated with the electronic boarding pass, an interactive button which, if interacted with, provides the user the ability to change the seat assignment in the RCS messaging session, etc.), and/or the like.

In some implementations, the RCS messaging session may be associated with another application on the user device. For example, the RCS messaging session between the user and the airline chatbot or representative may be associated with an application, on the user device, associated with the airline. The application associated with the airline may, for example, provide an interface for the user to browse flights and flight schedules, to book flights, to pay for booked flights, and/or the like. In some implementations, an interaction with the application associated with the airline may cause information to be included in the RCS messaging session. For example, the user may use the application associated with the airline to book a flight, and the airline chatbot or representative may send the user the user's boarding pass for the flight as an attachment in the RCS messaging session between the user and the airline chatbot or representative.

Turning now to FIG. 1E, and as shown by reference number 110, the user device may receive an input associated with the RCS messaging session displayed on the display of the user device. For example, the user device may display, on the display of the user device, an option button associated with the RCS application. The user of the user device may provide the input associated with the RCS messaging session by interacting with the option button. For example, the user may tap a portion of the touch screen display that is displaying the option button.

Turning now to FIG. 1F, and as shown by reference number 112, the user device may display, on the display of the user device, an options menu based on receiving the input associated with the option button. The options menu may include one or more interactive buttons (e.g., a delete button, a save shortcut button, and/or the like) that cause the user device to perform various actions based on receiving an input associated with the one or more interactive buttons. For example, the user device may receive an input associated with the user interacting with (e.g., tapping) the delete button, and the user device may delete the RCS messaging session between the user and the airline chatbot or representative based on receiving the input.

Turning now to FIG. 1G, and as shown by reference number 114, the user device may receive an instruction to generate a snapshot of the RCS messaging session. In some implementations, the user device may receive the instruction in the form of an input associated with the user interacting with (e.g., tapping) the save shortcut button. As shown by reference number 116, the user device may, based on receiving the instruction, generate a snapshot of the RCS messaging session displayed on the display of the user device.

In some implementations, the user device may automatically generate the snapshot of the RCS messaging session. For example, the user device may be configured to automatically generate snapshots for all RCS messaging sessions on the user device, for a particular type of RCS messaging session (such as a RCS messaging session with a particular third party), based on an attribute of a RCS messaging session (e.g., the user device is to generate a snapshot of a RCS messaging session when a size of the RCS messaging session satisfies a threshold (e.g., 50 megabytes, 20 messages exchanged in the RCS messaging session, etc.), the user device is to generate a snapshot of a RCS messaging session when a time duration since the RCS messaging session was initiated satisfies a time duration threshold, etc.), based on content included in a RCS messaging session (e.g., the user device is to generate a snapshot of a RCS messaging session when the RCS messaging session includes a boarding pass, the user device is to generate a snapshot of a RCS messaging session when the RCS messaging session includes a purchase receipt, the user device is to generate a snapshot of a RCS messaging session when the RCS messaging session includes a scheduled appointment, the user device is to generate a snapshot of a RCS messaging session when the RCS messaging session includes a particular keyword in a text message, etc.), and/or the like.

The snapshot of the RCS messaging session may include the information included in the RCS messaging session, such as one or more messages sent by the airline chatbot or representative and/or the user, information indicating a date and/or time of day the one or more messages were sent or received, read receipts associated with the one or more messages, any attachments and/or interactive objects sent by the user and/or the airline chatbot or representative, and/or the like. In some implementations, the snapshot of the RCS messaging session may include all the information included in the RCS messaging session (i.e., from a time the RCS messaging session was initiated to a time the user device received the input associated with the save shortcut button), may include information included in a subset of the RCS messaging session (e.g., information included in the 24 hours prior to a time the user device received the input associated with the save shortcut button, information included in the past 7 days prior to a time the user device received the input associated with the save shortcut button, etc.), and/or the like. In some implementations, the time duration of information included in a subset of the RCS messaging session that is to be included in the snapshot may be dynamically determined and/or adjusted. For example, the user device may determine the time duration of information included in a subset of the RCS messaging session that is to be included in the snapshot based on an event (e.g., if the user traveled previously on an airline and is scheduling another flight on the airline using the airline's RCS chat session, the user device may include only information exchanged in the RCS chat session with the airline chatbot or representative after a time the user traveled for the previous flight), based on a third party associated with the RCS messaging session (e.g., a RCS messaging session associated with a bank account may include a longer time duration of information included in the RCS messaging session relative to a RCS messaging session associated with a restaurant RCS chatbot or representative), and/or the like.

As shown by reference number 118, the user device may, based on generating the snapshot of the RCS messaging session, transmit the snapshot of the RCS messaging session to the RCS application platform. The RCS application platform may include one or more server devices, such as a cloud-based server device, an application server device, a backend server device, and/or the like. The RCS application platform may host the RCS application, may store information associated with the RCS application, and/or the like. For example, the RCS application platform may receive the snapshot of the RCS messaging session from the user device and may store the RCS messaging session, along with information associated with the snapshot of the RCS messaging session, in a data structure. In some implementations, the data structure may include a storage device, a memory, a database, and/or the like, that stores snapshots of RCS messaging sessions, information associated with the stored snapshots, and/or the like.

In some implementations, the information associated with the RCS messaging session may include identifying when the snapshot of the RCS messaging session was generated, information identifying when the snapshot of the RCS messaging session was received, information identifying a user device from which the snapshot of the RCS messaging session was received, information identifying an identifier associated with the snapshot of the RCS messaging session (e.g., a hash value, a file location, and/or the like, so that the RCS application platform can locate the snapshot of the RCS messaging session in the data structure), information identifying one or more users associated with the snapshot of the RCS messaging session (e.g., usernames, phone numbers, email addresses, etc.) and/or the like. In some implementations, the RCS application platform may store the information associated with the snapshot of the RCS messaging session in the data structure as metadata associated with the snapshot of the RCS messaging session (e.g., in an extensible markup language (XML) file, in a JSON file, etc.).

In this way, the user device reduces the amount of storage resources associated with the user device that are used to store information associated with RCS messaging sessions. Moreover, in this way, the user device may back up a RCS messaging session onto the RCS application platform, which can be recalled by the user device if the RCS messaging session on the user device is corrupted or deleted.

Turning now to FIG. 1H, and as shown by reference number 120, the user device may generate a shortcut to the RCS messaging session based on transmitting the snapshot of the RCS messaging session to the RCS application platform, and may display the shortcut on the display of the user device. The shortcut may be linked to the snapshot of the RCS messaging session stored on the RCS application platform. In some implementations, the shortcut may include an icon on a home screen of a GUI of the user device, a hyperlink displayed on the home screen of the GUI of the user device, a notification displayed on a lock screen of the GUI of the user device, a notification in a drop-down menu of the GUI of the user device, and/or the like. In some implementations, the shortcut icon may include a combination of the icon associated with the RCS application, the icon or avatar associated with the user, the icon or avatar associated with a party with which the user is communicating in the RCS messaging session (e.g., the airline chatbot or representative), and/or the like.

Turning now to FIG. 1I, the shortcut associated with the RCS messaging session may allow the user to quickly access the snapshot of the RCS messaging session to view and/or resume the RCS messaging session. As shown by reference number 122, to view and/or resume the RCS messaging session associated with the airline chatbot or representative, the user device may receive an input associated with the shortcut associated with the RCS messaging session. For example, the user device may receive the input in the form of the user interacting with the icon associated with the shortcut associated with the RCS messaging session (e.g., the user tapping on a portion of the display of the user device that is displaying the icon). As shown by reference number 124, based on receiving the input associated with the shortcut, the user device may obtain the snapshot of the RCS messaging session that is associated with the shortcut.

In some implementations, the user device may automatically retrieve the snapshot of the RCS messaging session. For example, the user device may automatically retrieve the snapshot of the RCS messaging session based on a location of the user device (e.g., the user device has entered an airport, and the user device may retrieve a snapshot of a RCS messaging session associated with an airline RCS chatbot or representative to display a boarding pass included in the RCS messaging session), based on a time and/or date (e.g., the user device may retrieve a snapshot of a RCS messaging session associated with an Internet service provider RCS chatbot or representative to display a service appointment attachment included in the RCS messaging session one hour prior to the service appointment), and/or the like.

To obtain the snapshot of the RCS messaging session, the user device may request the snapshot from the RCS application platform. The RCS application platform may retrieve the snapshot from the data structure based on receiving the request, and may transmit the snapshot to the user device.

Turning now to FIG. 1J, and as shown by reference number 126, the user device may receive the snapshot of the RCS messaging session that is associated with the shortcut, and may display, on the display of the user device, the information included in the snapshot. For example, the user device may, based on receiving the snapshot from the RCS application platform, launch the RCS application (if the RCS application is in an unlaunched state) and/or display the RCS application on the display of the user device, may display, in the RCS application, the RCS messaging session (e.g., the RCS messaging session between the user and the airline chatbot or representative), and may display, in the RCS messaging session, the information included in the snapshot of the RCS messaging session. In this way, the user device may resume the RCS messaging session from the snapshot of the RCS messaging session based on a single interaction (e.g., a single tap of the display of the user device) between the user and the user device. In this way, the user device reduces a quantity of interactions needed to resume a RCS messaging session, which simplifies the GUI of the user device and increases the efficiency of the GUI of the user device.

Turning now to FIG. 1K, in some implementations, the user device may periodically update a snapshot of a RCS messaging session stored on the RCS application platform. As shown by reference number 128, the user device may receive additional information associated with a RCS messaging session on the user device (e.g., the RCS messaging session between the user and the airline chatbot or representative). In some implementations, the user device may receive the additional information while the RCS messaging session and/or the RCS application on the user device is idle. The RCS messaging session and/or the RCS application may be idle if the RCS application is not launched, if the RCS application is minimized in a background of the GUI of the user device, if the user has not interacted with the RCS messaging session within a time period that satisfies a time period threshold (e.g., one minute, five minutes, etc.), and/or the like.

As shown by reference number 130, the user device may transmit, based on receiving the additional information associated with the RCS messaging session, the additional information to the RCS application platform along with an instruction to store the additional information in the snapshot of the RCS messaging session. In some implementations, the user device may transmit the additional information at periodic time intervals. For example, the user device may receive a first additional text message, and may transmit information identifying the first additional text message, along with any additional messages, attachments, and/or the like that were received in a 5-minute time interval commencing with the receipt of the first additional text message, to the RCS application platform. In some implementations, the user device may transmit the additional information based on a network connection type and/or network connection quality of the user device. For example, the user device may be configured to transmit the additional information based on the user device being connected to a Wi-Fi connection, may be configured to not transmit the additional information based on being connected to a cellular connection, may be configured to transmit the additional information based on being connected to a cellular connection with a signal strength that satisfies a signal strength threshold, and/or the like. In some implementations, the user device may transmit the additional information based on receiving an instruction in the form of input from a user. For example, the user device may display, on the display of the device, a notification that the additional information has been received, and the user may interact with the notification to instruct the user device to transmit the additional information.

As shown by reference number 132, the RCS application platform may receive the additional information from the user device, and may store, based on receiving the additional information and the instruction, the additional information in the snapshot of the RCS messaging session. In this way, the user device may ensure that the snapshot of the RCS messaging session is kept up to date with any messages, attachments, and/or the like, the user device receives after the user device generates the snapshot and while the RCS application and/or the RCS messaging session is idle.

Turning now to FIG. 1L, in some implementations, the user device may receive additional information associated with a RCS messaging session after the user device has generated a snapshot associated with the RCS messaging session, and while the RCS messaging session is active on the user device. The RCS messaging session may be active if the RCS application is launched on the user device, the RCS messaging session is displayed on the display of the user device, and/or the user device has received an input associated with the RCS messaging session in a time period that satisfies a time period threshold (e.g., one minute, five minutes, etc.), and/or the like.

As shown by reference number 134, the user device may receive additional information associated with the RCS messaging session between the user and the airline chatbot or representative. For example, after the user device generated the snapshot for the RCS messaging session between the user and the airline chatbot or representative, the user may send a text message in the RCS messaging session to the airline chatbot or representative to request a seat assignment change associated with the electronic boarding pass sent by the airline chatbot. The airline chatbot or representative may respond by sending a text message confirming receipt of the user's request, as well as an updated electronic boarding pass reflecting the seat assignment change.

Turning now to FIG. 1M, and as shown by reference number 136, the user device may receive an input, associated with the RCS messaging session, to save the additional information associated with the RCS messaging session. For example, the user device may display, on the display of the user device, an option button associated with the RCS application. The user of the user device may provide the input associated with the RCS messaging session by interacting with the option button. For example, the user may tap a portion of the touch screen display that is displaying the option button.

Turning now to FIG. 1N, and as shown by reference number 138, the user device may display, on the display of the user device, an options menu based on receiving the input associated with the option button. The options menu may include one or more interactive buttons (e.g., a delete button, a save shortcut button, and/or the like) that cause the user device to perform various actions based on receiving an input associated with the one or more interactive buttons.

Turning now to FIG. 1O, and as shown by reference number 140, the user device may receive an instruction to generate an updated snapshot of the RCS messaging session. For example, the user device may receive the instruction in the form of an input associated with the user interacting with (e.g., tapping) the save shortcut button. As shown by reference number 142, the user device may, based on receiving the instruction, generate an updated snapshot of the RCS messaging session between the user and the airline chatbot or representative.

In some implementations, the user device may automatically generate the updated snapshot. For example, the user device may be configured to automatically generate updated snapshots for all RCS messaging sessions on the user device, for a particular type of RCS messaging session (such as a RCS messaging session with a particular third party), based on an attribute of a RCS messaging session (e.g., the user device is to generate an updated snapshot of a RCS messaging session when a size of the RCS messaging session satisfies a threshold (e.g., 10 megabytes, 50 messages exchanged in the RCS messaging session, etc.), the user device is to generate an updated snapshot of a RCS messaging session when a time duration since the last snapshot for the RCS messaging session was generated satisfies a time duration threshold, etc.), based on content included in a RCS messaging session since the previous snapshot (e.g., the user device is to generate an updated snapshot of a RCS messaging session when the RCS messaging session includes a delivery confirmation message, etc.), and/or the like.

The updated snapshot of the RCS messaging session may include the additional information, received in the RCS messaging session, after the user device generated the snapshot of the RCS messaging session. For example, the updated snapshot of the RCS messaging session between the user and the airline chatbot or representative may include the additional text messages sent by the airline chatbot or representative and/or the user, information indicating a date and/or time of day the additional text messages were sent or received, read receipts associated with the additional text messages, the updated electronic boarding pass, and/or the like.

In some implementations, the user device may generate the updated snapshot by obtaining the snapshot of the RCS messaging session, that was previously generated by the user device, from the RCS application platform and incorporating the additional information received in the RCS messaging session into the snapshot. In some implementations, the user device may generate the updated snapshot by generating a new snapshot of the RCS messaging session that includes all the information included in the RCS messaging session (i.e., from a time the RCS messaging session was initiated to a time the user device received the input associated with generating the updated snapshot).

As shown by reference number 144, the user device may, based on generating the updated snapshot of the RCS messaging session, transmit the updated snapshot of the RCS messaging session to the RCS application platform along with an instruction to store the updated snapshot in the data structure on the RCS application platform. In some implementations, the user device may provide another instruction to the RCS application platform to delete, from the data structure, the snapshot that was previously generated by the user device. In some implementations, the RCS application platform may store the updated snapshot of the RCS messaging session along with the snapshot of the RCS messaging session that was previously generated by the user device. In this way, the user device reduces the amount of storage resources associated with the user device that are used to store information associated with RCS messaging sessions. Moreover, in this way, the user device may back up a RCS messaging session onto the RCS application platform, which can be recalled by the user device if the RCS messaging session on the user device is corrupted or deleted. Further, in this way, the user device may store multiple snapshots of a RCS messaging session from various points in time, which provides redundancy in storing snapshots of a RCS messaging session. Thus, if a first snapshot associated with a RCS messaging session stored in the data structure of the RCS application platform becomes corrupted, the user device may obtain a second snapshot associated with the RCS messaging session so that at least some of the information included in the RCS messaging session can be displayed on the display of the user device.

Turning now to FIG. 1P, and as shown by reference number 146, the user device may update the shortcut to the RCS messaging session based on transmitting the updated snapshot of the RCS messaging session to the RCS application platform. The user device may update the shortcut to the RCS messaging session by linking the shortcut to the updated snapshot of the RCS messaging session. In this way, when the user device receives an input (e.g., from the user) to launch the updated snapshot of the RCS messaging session, the user device obtains the updated snapshot of the RCS messaging session from the RCS application platform instead of the snapshot of the RCS messaging session previously generated by the user device.

Turning now to FIG. 1Q, the updated shortcut associated with the RCS messaging session may allow the user to quickly access the updated snapshot of the RCS messaging session to view and/or resume the RCS messaging session. As shown by reference number 148, to view and/or resume the RCS messaging session associated with the airline chatbot or representative from the updated snapshot, the user device may receive an input associated with the updated shortcut associated with the RCS messaging session. For example, the user device may receive the input in the form of the user interacting with the icon associated with the updated shortcut associated with the RCS messaging session (e.g., the user tapping on a portion of the display of the user device that is displaying the icon).

As shown by reference number 150, based on receiving the input associated with the updated shortcut, the user device may obtain the updated snapshot of the RCS messaging session that is associated with the updated shortcut. To obtain the updated snapshot of the RCS messaging session, the user device may request the updated snapshot from the RCS application platform. The RCS application platform may retrieve the updated snapshot from the data structure based on receiving the request, and may transmit the updated snapshot to the user device.

Turning now to FIG. 1R, and as shown by reference number 152, the user device may receive the updated snapshot of the RCS messaging session that is associated with the updated shortcut, and may display, on the display of the user device, the information included in the updated snapshot. For example, the user device may, based on receiving the updated snapshot from the RCS application platform, launch the RCS application (if the RCS application is in an unlaunched state) and/or display the RCS application on the display of the user device, may display, in the RCS application, the RCS messaging session (e.g., the RCS messaging session between the user and the airline chatbot or representative), and may display, in the RCS messaging session, the information included in the updated snapshot of the RCS messaging session. In this way, the user device may resume the RCS messaging session from the updated snapshot of the RCS messaging session based on a single interaction (e.g., a single tap of the display of the user device) between the user and the user device. In this way, the user device reduces a quantity of interactions needed to resume a RCS messaging session, which simplifies the GUI of the user device and increases the efficiency of the GUI of the user device.

The number and arrangement of devices and networks shown in FIGS. 1A-1R are provided as an example. In practice, there may be additional devices, applications and/or application platforms, fewer devices, applications and/or application platforms, different devices, applications and/or application platforms, and/or differently arranged devices, applications and/or application platforms than those shown in FIGS. 1A-1R.

Figure 2:
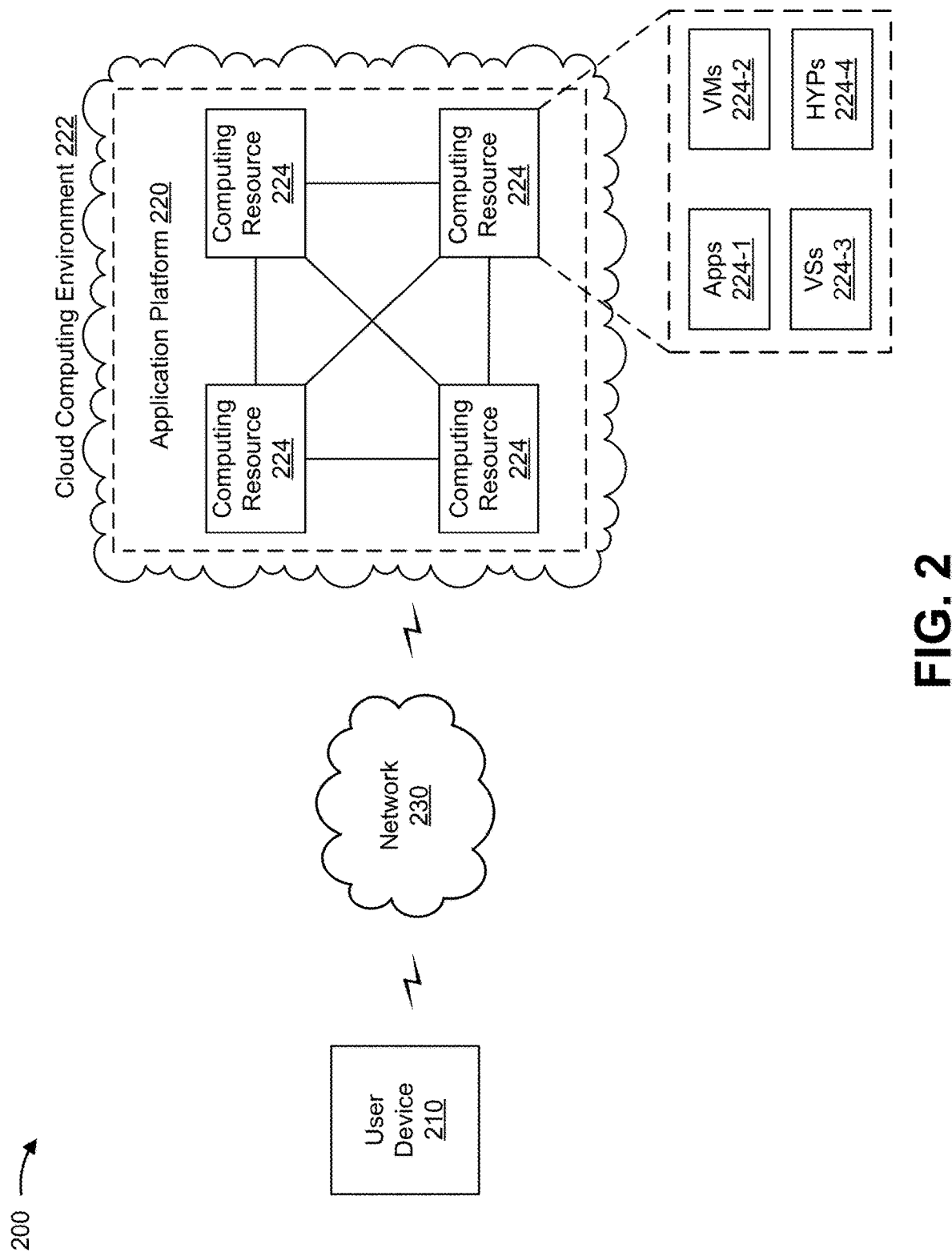
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an application platform 220 in a cloud computing environment 222 that includes a set of computing resources 224, and a network 230. Devices of environment 200 may interconnect via wired connections, wireless connections, or a combination of wired and wireless connections.

User device 210 includes one or more devices capable of receiving, generating, storing, processing, and/or providing data associated with generating a shortcut associated with a RCS messaging session. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. User device 210 may run an RCS application, display an RCS messaging session, generate a snapshot of an RCS messaging session, provide a snapshot to application platform 220, and/or obtain a snapshot from application platform 220 based on user interaction with a shortcut. Additionally, user device 210 may receive additional information associated with the RCS messaging session, generate an updated snapshot of an RCS messaging session, transmit an updated snapshot to application platform 220, obtain an updated snapshot from application platform 220, and/or display an updated snapshot.

Application platform 220 includes one or more devices capable of receiving, generating, storing, processing, and/or providing data associated with generating a shortcut associated with a RCS messaging session. For example, application platform 220 may include a server device (e.g., a host server, a web server, an application server, etc.), a data center device, or a similar device. Application platform 220 may receive and/or store a snapshot of a RCS messaging session from user device 210, receive and/or store additional information associated with an RCS messaging session, receive an updated snapshot of an RCS messaging session from user device 210, provide an updated snapshot to user device 210, and/or the like.

In some implementations, as shown, application platform 220 may be hosted in cloud computing environment 222. Notably, while implementations described herein describe application platform 220 as being hosted in cloud computing environment 222, in some implementations, application platform 220 may not be cloud-based (i.e., may be implemented outside of a cloud computing environment) or may be partially cloud-based.

Cloud computing environment 222 includes an environment that hosts application platform 220. Cloud computing environment 222 may provide computation, software, data access, storage, and/or other services. As shown, cloud computing environment 222 may include a group of computing resources 224 (referred to collectively as "computing resources 224" and individually as "computing resource 224").

Computing resource 224 includes one or more personal computers, workstation computers, server devices, or another type of computation and/or communication device. In some implementations, computing resource 224 may host application platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 may include a group of cloud resources, such as one or more applications ("APPs") 224-1, one or more virtual machines ("VMs") 224-2, one or more virtualized storages ("VSs") 224-3, or one or more hypervisors ("HYPs") 224-4.

Application 224-1 includes one or more software applications that may be provided to or accessed by one or more devices of environment 200. Application 224-1 may eliminate a need to install and execute the software applications on devices of environment 200. For example, application 224-1 may include software associated with application platform 220 and/or any other software capable of being provided via cloud computing environment 222. In some implementations, one application 224-1 may send/receive information to/from one or more other applications 224-1, via virtual machine 224-2. In some implementations, application 224-1 may include a software application associated with one or more databases and/or operating systems. For example, application 224-1 may include an enterprise application, a functional application, an analytics application, and/or the like.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
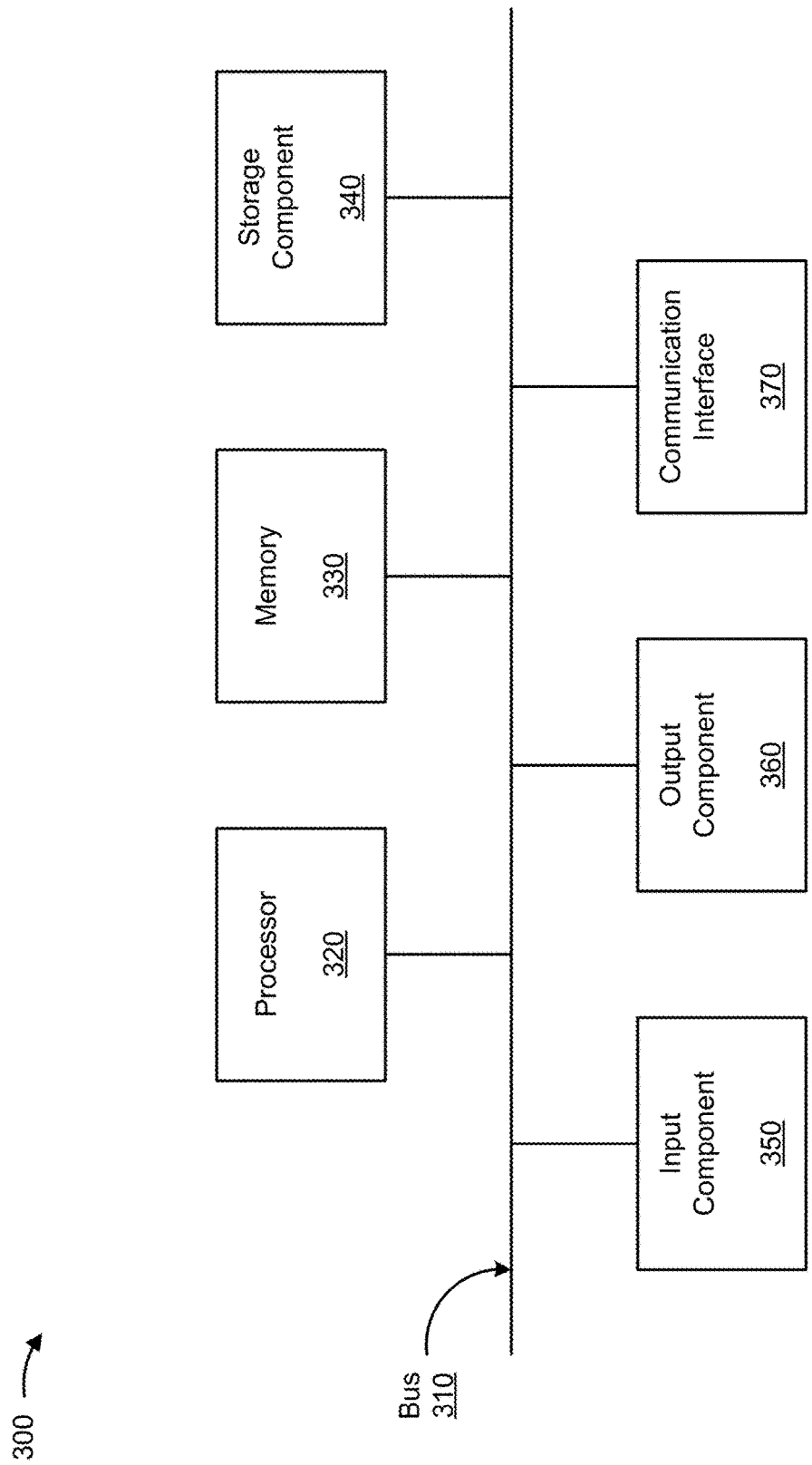
FIG. 3 is a diagram of example components of one or more devices of FIG. 2.

FIG. 3 is a diagram of example components of a device 300. Device 300 may correspond to user device 210, application platform 220, and/or various devices included in network 230. In some implementations, user device 210, application platform 220, and/or various devices included in network 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
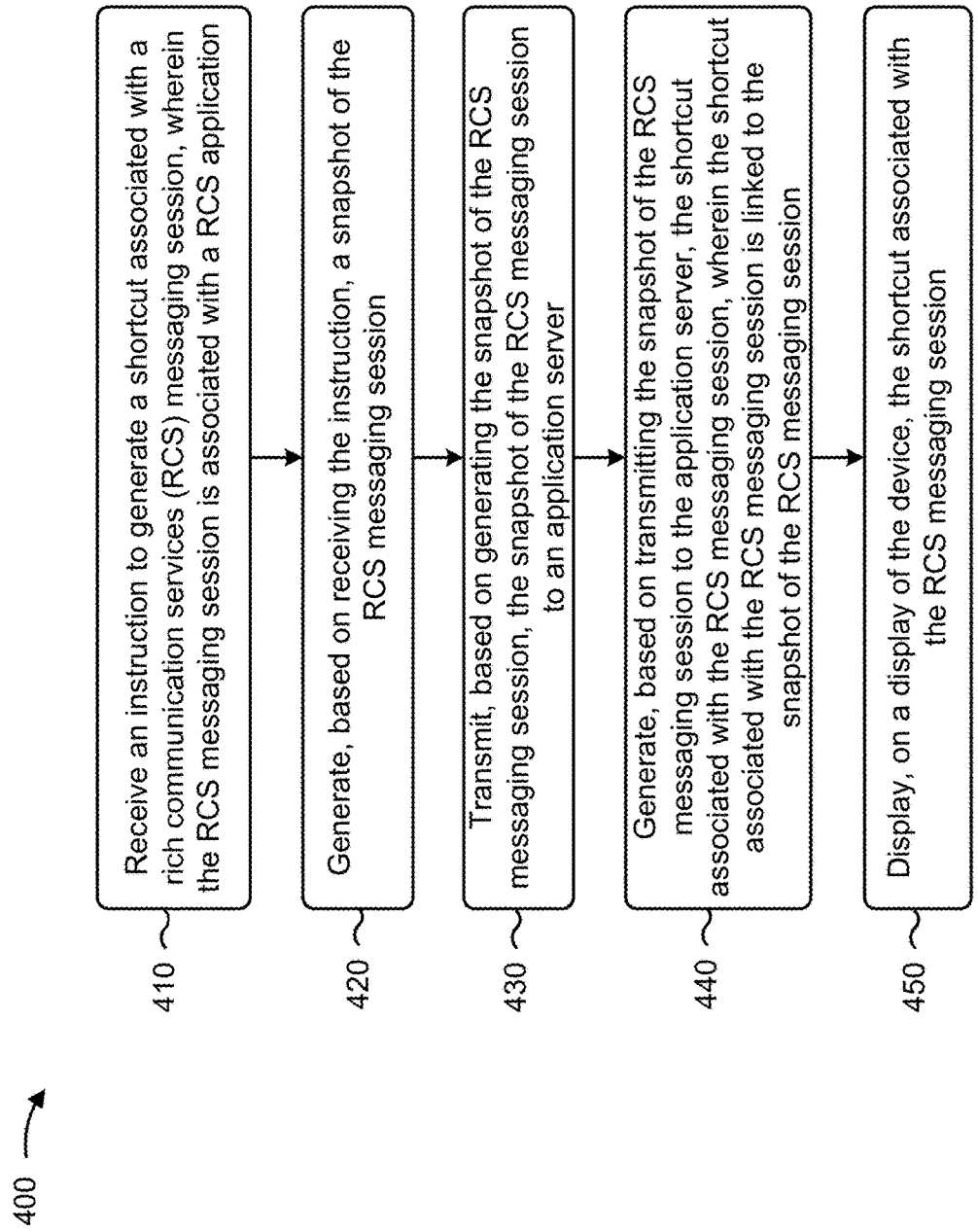
FIG. 4 is a flow chart of an example process for generating a shortcut associated with a RCS messaging session.

FIG. 4 is a flow chart of an example process 400 for generating a shortcut associated with a RCS messaging session. In some implementations, one or more process blocks of FIG. 4 may be performed by a user device (e.g., user device 210). In some implementations, one or more process blocks of FIG. 4 may be performed by another device or a group of devices separate from or including the user device, such as an application platform (e.g., application platform 220).

As shown in FIG. 4, process 400 may include receiving an instruction to generate a shortcut associated with a rich communication services (RCS) messaging session, wherein the RCS messaging session is associated with a RCS application (block 410). For example, the user device (e.g., using processor 320, memory 330, storage component 340, input component 350, communication interface 370, and/or the like) may receive an instruction to generate a shortcut associated with a RCS messaging session, as described above in connection with FIGS. 1A-1R. In some implementations, the RCS messaging session may be associated with a RCS application.

As further shown in FIG. 4, process 400 may include generating, based on receiving the instruction, a snapshot of the RCS messaging session (block 420). For example, the user device (e.g., using processor 320, memory 330, storage component 340, and/or the like) may generate, based on receiving the instruction, a snapshot of the RCS messaging session, as described above in connection with FIGS. 1A-1R.

As further shown in FIG. 4, process 400 may include transmitting, based on generating the snapshot of the RCS messaging session, the snapshot of the RCS messaging session to an application server (block 430). For example, the user device (e.g., using processor 320, memory 330, storage component 340, output component 360, communication interface 370, and/or the like) may transmit, based on generating the snapshot of the RCS messaging session, the snapshot of the RCS messaging session to an application server, as described above in connection with FIGS. 1A-1R.

As further shown in FIG. 4, process 400 may include generating, based on transmitting the snapshot of the RCS messaging session to the application server, the shortcut associated with the RCS messaging session, wherein the shortcut associated with the RCS messaging session is linked to the snapshot of the RCS messaging session (block 440). For example, the user device (e.g., using processor 320, memory 330, storage component 340, and/or the like) may generate, based on transmitting the snapshot of the RCS messaging session to the application server, the shortcut associated with the RCS messaging session, as described above in connection with FIGS. 1A-1R. In some implementations, the shortcut associated with the RCS messaging session may be linked to the snapshot of the RCS messaging session.

As further shown in FIG. 4, process 400 may include displaying, on a display of the device, the shortcut associated with the RCS messaging session (block 450). For example, the user device (e.g., using processor 320, memory 330, storage component 340, output component 360, communication interface 370, and/or the like) may display, on a display of the device, the shortcut associated with the RCS messaging session, as described above in connection with FIGS. 1A-1R.

Process 400 may include additional implementations, such as any single implementation or any combination of implementations described below and/or described with regard to any other process described herein.

In some implementations, the snapshot of the RCS messaging session may include information identifying one or more messages included in the RCS messaging session, information identifying a time stamp associated with the one or more messages, and/or information identifying one or more attachments included in the RCS messaging session. In some implementations, the shortcut associated with the RCS messaging session may include a notification displayed on the device, an icon displayed on the device, and/or a hyperlink displayed on the device.

In some implementations, the user device may receive an input associated with a user interaction with the shortcut associated with the RCS messaging session, may obtain, based on receiving the input, the snapshot of the RCS messaging session from the application server, and may display the snapshot of the RCS messaging session in the RCS application on the device. In some implementations, the user device may receive, after generating the snapshot of the RCS messaging session, additional information associated with the RCS messaging session, and may, based on receiving the additional information, transmit, to the application server, the additional information and an instruction to store the additional information in the snapshot of the RCS messaging session.

In some implementations, the additional information associated with the RCS messaging session may include information identifying one or more messages that were transmitted in the RCS messaging session after the snapshot of the RCS messaging session was generated, information identifying a time stamp associated with the one or more messages that were transmitted in the RCS messaging session after the snapshot of the RCS messaging session was generated, and/or information identifying one or more additional attachments that were transmitted in the RCS messaging session after the snapshot of the RCS messaging session was generated.

In some implementations, the user device may receive additional information associated with the RCS messaging session, may receive another instruction to generate another shortcut associated with the RCS messaging session, and may generate, based on receiving the other instruction, an updated snapshot of the RCS messaging session, where the updated snapshot of the RCS messaging session includes information included in the snapshot of the RCS messaging session, and the additional information associated with the RCS messaging session. Additionally, the user device may transmit, based on generating the updated snapshot of the RCS messaging session, the updated snapshot of the RCS messaging session to the application server associated with the RCS application, and may link, based on transmitting the snapshot of the RCS messaging session to the application server, the shortcut associated with the RCS messaging session to the updated snapshot of the RCS messaging session.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for generating a shortcut associated with a RCS messaging session. In some implementations, one or more process blocks of FIG. 5 may be performed by a user device (e.g., user device 210). In some implementations, one or more process blocks of FIG. 5 may be performed by another device or a group of devices separate from or including the user device, such as an application platform (e.g., application platform 220).

As shown in FIG. 5, process 500 may include receiving an instruction to generate a shortcut associated with a rich communication services (RCS) messaging session, wherein the RCS messaging session is associated with a RCS application, and wherein the RCS messaging session is associated with a user and a chatbot (block 510). For example, the user device (e.g., using processor 320, memory 330, storage component 340, input component 350, communication interface 370, and/or the like) may receive an instruction to generate a shortcut associated with a RCS messaging session, as described above in connection with FIGS. 1A-1R. In some implementations, the RCS messaging session may be associated with a RCS application. In some implementations, the RCS messaging session may be associated with a user and a chatbot.

As shown in FIG. 5, process 500 may include generating, based on receiving the instruction, a snapshot of the RCS messaging session (block 520). For example, the user device (e.g., using processor 320, memory 330, storage component 340, and/or the like) may generate, based on receiving the instruction, a snapshot of the RCS messaging session, as described above in connection with FIGS. 1A-1R.

As shown in FIG. 5, process 500 may include transmitting, based on generating the snapshot of the RCS messaging session, the snapshot of the RCS messaging session to an application server (block 530). For example, the user device (e.g., using processor 320, memory 330, storage component 340, output component 360, communication interface 370, and/or the like) may transmit, based on generating the snapshot of the RCS messaging session, the snapshot of the RCS messaging session to an application server, as described above in connection with FIGS. 1A-1R.

As shown in FIG. 5, process 500 may include generating, based on transmitting the snapshot of the RCS messaging session to the application server, the shortcut associated with the RCS messaging session, wherein the shortcut associated with the RCS messaging session is linked to the snapshot of the RCS messaging session (block 540). For example, the user device (e.g., using processor 320, memory 330, storage component 340, and/or the like) may generate, based on transmitting the snapshot of the RCS messaging session to the application server, the shortcut associated with the RCS messaging session, as described above in connection with FIGS. 1A-1R. In some implementations, the shortcut associated with the RCS messaging session is linked to the snapshot of the RCS messaging session.

As shown in FIG. 5, process 500 may include displaying, on a display of the device, the shortcut associated with the RCS messaging session (block 550). For example, the user device (e.g., using processor 320, memory 330, storage component 340, output component 360, communication interface 370, and/or the like) may display, on a display of the device, the shortcut associated with the RCS messaging session, as described above in connection with FIGS. 1A-1R.

Process 500 may include additional implementations, such as any single implementation or any combination of implementations described below and/or described with regard to any other process described herein.

In some implementations, the snapshot of the RCS messaging session may include information identifying a message included in the RCS messaging session, information identifying a time stamp associated with the message, information identifying an attachment included in the RCS messaging session, and/or information identifying an image included in the RCS messaging session. In some implementations, the shortcut associated with the RCS messaging session may include an icon displayed on a home screen of the device, and/or a hyperlink displayed on the home screen of the device.

In some implementations, the user device may receive, after generating the snapshot of the RCS messaging session, additional information associated with the RCS messaging session, where the additional information associated with the RCS messaging session may be received while the RCS messaging session is idle. Additionally, the user device may, based on receiving the additional information, transmit, to the application server, the additional information and an instruction to store the additional information in the snapshot of the RCS messaging session. In some implementations, the user device may receive an input associated with a user interaction with the shortcut associated with the RCS messaging session, may obtain, based on receiving the input, the snapshot of the RCS messaging session from the application server, and may display, on the display of the device, the snapshot of the RCS messaging session in the RCS application.

In some implementations, the user device may receive additional information associated with the RCS messaging session, may receive another instruction to generate another shortcut associated with the RCS messaging session, and may generate, based on receiving the other instruction, an updated snapshot of the RCS messaging session, where the updated snapshot of the RCS messaging session includes information included in the snapshot of the RCS messaging session, and includes the additional information associated with the RCS messaging session. Additionally, the user device may transmit, based on generating the updated snapshot of the RCS messaging session, the updated snapshot of the RCS messaging session to the application server associated with the RCS application, and may link, based on transmitting the snapshot of the RCS messaging session to the application server, the shortcut associated with the RCS messaging session to the updated snapshot of the RCS messaging session.

In some implementations, the additional information associated with the RCS messaging session may include information identifying an additional message that transmitted in the RCS messaging session after the snapshot of the RCS messaging session was generated, information identifying an additional time stamp associated with the additional message, information identifying an additional attachment that transmitted in the RCS messaging session after the snapshot of the RCS messaging session was generated, and/or information identifying an additional image that transmitted in the RCS messaging session after the snapshot of the RCS messaging session was generated.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for generating a shortcut associated with a RCS messaging session. In some implementations, one or more process blocks of FIG. 6 may be performed by a device, such as a user device (e.g., user device 210). In some implementations, one or more process blocks of FIG. 6 may be performed by another device or a group of devices separate from or including the user device, such as an application platform (e.g., application platform 220).

As shown in FIG. 6, process 600 may include receiving an instruction to generate a shortcut associated with a rich communication services (RCS) messaging session, wherein the RCS messaging session is associated with a RCS application, wherein the RCS messaging session is further associated with another application included on the device, and wherein the RCS messaging session is associated with a user and a chatbot (block 610). For example, the user device (e.g., using processor 320, memory 330, storage component 340, input component 350, communication interface 370, and/or the like) may receive an instruction to generate a shortcut associated with a RCS messaging session, as described above in connection with FIGS. 1A-1R. In some implementations, the RCS messaging session may be associated with a RCS application, the RCS messaging session may be associated with another application included on the device, and the RCS messaging session may be associated with a user and a chatbot.

As shown in FIG. 6, process 600 may include generating, based on receiving the instruction, a snapshot of the RCS messaging session (block 620). For example, the user device (e.g., using processor 320, memory 330, storage component 340, and/or the like) may generate, based on receiving the instruction, a snapshot of the RCS messaging session, as described above in connection with FIGS. 1A-1R.

As shown in FIG. 6, process 600 may include transmitting, based on generating the snapshot of the RCS messaging session, the snapshot of the RCS messaging session to an application server (block 630). For example, the user device (e.g., using processor 320, memory 330, storage component 340, output component 360, communication interface 370, and/or the like) may transmit, based on generating the snapshot of the RCS messaging session, the snapshot of the RCS messaging session to an application server, as described above in connection with FIGS. 1A-1R.

As shown in FIG. 6, process 600 may include generating, based on transmitting the snapshot of the RCS messaging session to the application server, the shortcut associated with the RCS messaging session, wherein the shortcut associated with the RCS messaging session is linked to the snapshot of the RCS messaging session (block 640). For example, the user device (e.g., using processor 320, memory 330, storage component 340, output component 360, communication interface 370, and/or the like) may generate, based on transmitting the snapshot of the RCS messaging session to the application server, the shortcut associated with the RCS messaging session, as described above in connection with FIGS. 1A-1R. In some implementations, the shortcut associated with the RCS messaging session may be linked to the snapshot of the RCS messaging session. As shown in FIG. 6, process 600 may include displaying, on a display of the device, the shortcut associated with the RCS messaging session (block 650). For example, the user device (e.g., using processor 320, memory 330, storage component 340, output component 360, communication interface 370, and/or the like) may display, on a display of the device, the shortcut associated with the RCS messaging session, as described above in connection with FIGS. 1A-1R.

Process 600 may include additional aspects, such as any single aspect or any combination of aspects described below and/or in connection with one or more other processes described elsewhere herein.

In some implementations, the snapshot of the RCS messaging session may include information identifying a message included in the RCS messaging session, information identifying a time stamp associated with the message, information identifying an attachment included in the RCS messaging session, information identifying an image included in the RCS messaging session, information identifying the user, information identifying the chatbot, and/or information identifying the other application included on the device. In some implementations, the shortcut associated with the RCS messaging session may include an icon displayed on a home screen of the device, a hyperlink displayed on the home screen of the device, and/or a notification displayed on a lock screen of the device.

In some implementations, the user device may receive, after generating the snapshot of the RCS messaging session, additional information associated with the RCS messaging session, where the additional information associated with the RCS messaging session is received while the RCS messaging session is idle. Additionally, the user device may, based on receiving the additional information, transmit, to the application server, the additional information and an instruction to store the additional information in the snapshot of the RCS messaging session, and display, on the display of the device, a notification associated with the additional information. In some implementations, the user device may receive an input associated with a user interaction with the shortcut associated with the RCS messaging session, may obtain, based on receiving the input, the snapshot of the RCS messaging session from the application server, and may display, on the display of the device, the snapshot of the RCS messaging session in the RCS application.

In some implementations, the user device may receive, while the RCS messaging session is active, additional information associated with the RCS messaging session, may receive another instruction to generate another shortcut associated with the RCS messaging session, and may generate, based on receiving the other instruction, an updated snapshot of the RCS messaging session, where the updated snapshot of the RCS messaging session includes information included in the snapshot of the RCS messaging session, and the additional information associated with the RCS messaging session. Additionally, the user device may transmit, based on generating the updated snapshot of the RCS messaging session, the updated snapshot of the RCS messaging session to the application server associated with the RCS application, and may link, based on transmitting the snapshot of the RCS messaging session to the application server, the shortcut associated with the RCS messaging session to the updated snapshot of the RCS messaging session.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, user device 210 reduces the amount of storage resources associated with user device 210 that are used to store information associated with RCS messaging sessions. Moreover, in this way, user device 210 may back up a RCS messaging session onto a RCS application platform (e.g., application platform 220), which can be recalled by user device 210 if the RCS messaging session on user device 210 is corrupted or deleted. Further, in this way, user device 210 may resume the RCS messaging session from the snapshot of the RCS messaging session based on a single interaction (e.g., a single tap of the display of the user device) between the user and user device 210. Still further, in this way, user device 210 reduces a quantity of interactions needed to resume a RCS messaging session, which simplifies the GUI of user device 210 and increases the efficiency of the GUI of user device 210.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      receive, at the device, an instruction to generate a shortcut associated with a rich communication services (RCS) messaging session,
         wherein the RCS messaging session is associated with a RCS application;
      generate, at the device, based on receiving the instruction, a snapshot of the RCS messaging session,
         wherein the snapshot is associated with a position within the RCS messaging session at a point in time;
      transmit, by the device, based on generating the snapshot of the RCS messaging session, the snapshot of the RCS messaging session to an application server;
      receive, after generating the snapshot of the RCS messaging session, additional information associated with the RCS messaging session;
      transmit, to the application server and based on receiving the additional information, the additional information and an instruction to store the additional information in the snapshot of the RCS messaging session;
      generate, at the device, based on transmitting the snapshot of the RCS messaging session to the application server, the shortcut associated with the RCS messaging session,
         wherein the shortcut associated with the RCS messaging session is linked to the snapshot of the RCS messaging session, and
         wherein the shortcut associated with the RCS messaging session allows access to the snapshot of the RCS messaging session to resume the RCS messaging session from the snapshot of the RCS messaging session, and wherein resuming the RCS messaging session from the snapshot of the RCS messaging session comprises:
launching the RCS application, and
displaying, in the RCS messaging session, information included in the snapshot of the RCS messaging session when the snapshot of the RCS messaging session was generated at the position within the RCS messaging session at the point in time prior to subsequent information being displayed in the RCS messaging session; and
display, on a home screen or lock screen of a display of the device, the shortcut associated with the RCS messaging session.

2. The device of claim 1, wherein the snapshot of the RCS messaging session includes at least one of:
information identifying one or more messages included in the RCS messaging session,
information identifying a time stamp associated with the one or more messages, or
information identifying one or more attachments included in the RCS messaging session.

3. The device of claim 1, wherein the shortcut associated with the RCS messaging session includes at least one of:
a notification displayed on the device,
an icon displayed on the device, or
a hyperlink displayed on the device.

4. The device of claim 1, wherein the one or more processors are further to:
receive an input associated with a user interaction with the shortcut associated with the RCS messaging session;
obtain, based on receiving the input, the snapshot of the RCS messaging session from the application server; and
display the snapshot of the RCS messaging session in the RCS application on the device.

5. The device of claim 1, wherein the additional information associated with the RCS messaging session includes at least one of:
information identifying one or more messages that were transmitted in the RCS messaging session after the snapshot of the RCS messaging session was generated,
information identifying a time stamp associated with the one or more messages that were transmitted in the RCS messaging session after the snapshot of the RCS messaging session was generated, or
information identifying one or more additional attachments that were transmitted in the RCS messaging session after the snapshot of the RCS messaging session was generated.

6. The device of claim 1, wherein the one or more processors are further to:
receive other additional information associated with the RCS messaging session;
receive another instruction to generate another shortcut associated with the RCS messaging session;
generate, based on receiving the other instruction, an updated snapshot of the RCS messaging session,
wherein the updated snapshot of the RCS messaging session includes:
information included in the snapshot of the RCS messaging session, and
the other additional information associated with the RCS messaging session;
transmit, based on generating the updated snapshot of the RCS messaging session, the updated snapshot of the RCS messaging session to the application server associated with the RCS application; and
link, based on transmitting the snapshot of the RCS messaging session to the application server, the shortcut associated with the RCS messaging session to the updated snapshot of the RCS messaging session.

7. The device of claim 1, wherein the one or more processors are further to:
receive another instruction to generate another shortcut associated with the RCS messaging session; and
generate, based on receiving the other instruction, an updated snapshot of the RCS messaging session,
wherein the updated snapshot of the RCS messaging session includes:
information included in the snapshot of the RCS messaging session, and
the additional information associated with the RCS messaging session.

8. A non-transitory computer-readable medium storing instructions, the instructions comprising:
one or more instructions that, when executed by one or more processors of a device, cause the one or more processors to:
receive, at the device, an instruction to generate a shortcut associated with a rich communication services (RCS) messaging session,
wherein the RCS messaging session is associated with a RCS application, and
wherein the RCS messaging session is associated with a user and a chatbot;
generate, at the device and based on receiving the instruction, a snapshot of the RCS messaging session,
wherein the snapshot is associated with a position within the RCS messaging session at a point in time;
transmit, by the device and based on generating the snapshot of the RCS messaging session, the snapshot of the RCS messaging session to an application server;
receive, after generating the snapshot of the RCS messaging session, additional information associated with the RCS messaging session;
transmit, to the application server and based on receiving the additional information, the additional information and an instruction to store the additional information in the snapshot of the RCS messaging session;
generate, at the device and based on transmitting the snapshot of the RCS messaging session to the application server, the shortcut associated with the RCS messaging session,
wherein the shortcut associated with the RCS messaging session is linked to the snapshot of the RCS messaging session, and
wherein the shortcut associated with the RCS messaging session allows access to the snapshot of the RCS messaging session to resume the RCS messaging session from the snapshot of the RCS messaging session, and
wherein the one or more processors, when resuming the RCS messaging session from the snapshot of the RCS messaging session, are to:
launch the RCS application, and
display, in the RCS messaging session, information included in the snapshot of the RCS messaging session when the snapshot of the RCS messaging session was generated at the position within the RCS messaging session at the point in time prior to subsequent information being displayed in the RCS messaging session; and display, on a home screen or lock screen of a display of the device, the shortcut associated with the RCS messaging session.

9. The non-transitory computer-readable medium of claim 8, wherein the snapshot of the RCS messaging session includes at least one of:

information identifying a message included in the RCS messaging session, information identifying a time stamp associated with the message, information identifying an attachment included in the RCS messaging session, or information identifying an image included in the RCS messaging session.

10. The non-transitory computer-readable medium of claim 8, wherein the shortcut associated with the RCS messaging session includes at least one of:

an icon displayed on the home screen of the device, or a hyperlink displayed on the home screen of the device.

11. The non-transitory computer-readable medium of claim 8, wherein the one or more instructions, when executed by the one or more processors, further cause the one or more processors to:

receive, after generating the snapshot of the RCS messaging session, other additional information associated with the RCS messaging session, wherein the other additional information associated with the RCS messaging session is received while the RCS messaging session is idle; and based on receiving the other additional information:

transmit, to the application server, the other additional information and an instruction to store the other additional information in the snapshot of the RCS messaging session.

12. The non-transitory computer-readable medium of claim 8, wherein the one or more instructions, when executed by the one or more processors, further cause the one or more processors to:

receive an input associated with a user interaction with the shortcut associated with the RCS messaging session;

obtain, based on receiving the input, the snapshot of the RCS messaging session from the application server; and display, on the display of the device, the snapshot of the RCS messaging session in the RCS application.

13. The non-transitory computer-readable medium of claim 8, wherein the one or more instructions, when executed by the one or more processors, further cause the one or more processors to:

receive other additional information associated with the RCS messaging session;

receive another instruction to generate another shortcut associated with the RCS messaging session;

generate, based on receiving the other instruction, an updated snapshot of the RCS messaging session, wherein the updated snapshot of the RCS messaging session includes:

information included in the snapshot of the RCS messaging session, and the other additional information associated with the RCS messaging session;

transmit, based on generating the updated snapshot of the RCS messaging session, the updated snapshot of the RCS messaging session to the application server associated with the RCS application; and link, based on transmitting the snapshot of the RCS messaging session to the application server, the shortcut associated with the RCS messaging session to the updated snapshot of the RCS messaging session.

14. The non-transitory computer-readable medium of claim 13, wherein the other additional information associated with the RCS messaging session includes at least one of:

information identifying an additional message that transmitted in the RCS messaging session after the snapshot of the RCS messaging session was generated, information identifying an additional time stamp associated with the additional message, information identifying an additional attachment that transmitted in the RCS messaging session after the snapshot of the RCS messaging session was generated, or information identifying an additional image that transmitted in the RCS messaging session after the snapshot of the RCS messaging session was generated.

15. A method, comprising:

receiving, at a device, an instruction to generate a shortcut associated with a rich communication services (RCS) messaging session, wherein the RCS messaging session is associated with a RCS application, wherein the RCS messaging session is further associated with another application included on the device, and wherein the RCS messaging session is associated with a user and a chatbot;

generating, by the device and based on receiving the instruction, a snapshot of the RCS messaging session, wherein the snapshot is associated with a position within the RCS messaging session at a point in time;

transmitting, by the device and based on generating the snapshot of the RCS messaging session, the snapshot of the RCS messaging session to an application server;

receiving, by the device and after generating the snapshot of the RCS messaging session, additional information associated with the RCS messaging session;

transmit, by the device, to the application server, and based on receiving the additional information, the additional information and an instruction to store the additional information in the snapshot of the RCS messaging session;

generating, by the device and based on transmitting the snapshot of the RCS messaging session to the application server, the shortcut associated with the RCS messaging session, wherein the shortcut associated with the RCS messaging session is linked to the snapshot of the RCS messaging session, and wherein the shortcut associated with the RCS messaging session allows access to the snapshot of the RCS messaging session to resume the RCS messaging session from the snapshot of the RCS messaging session, and wherein the instructions, that cause the one or more processors to resume the RCS messaging session from the snapshot of the RCS messaging session, cause the one or more processors to:

launch the RCS application, and display, in the RCS messaging session, information included in the snapshot of the RCS messaging session when the snapshot of the RCS messaging session was generated at the position within the RCS messaging session at the point in time prior to subsequent information being displayed in the RCS messaging session; and displaying, on a home screen or lock screen of a display of the device, the shortcut associated with the RCS messaging session.

16. The method of claim 15, wherein the snapshot of the RCS messaging session includes at least one of:

information identifying a message included in the RCS messaging session, information identifying a time stamp associated with the message, information identifying an attachment included in the RCS messaging session, information identifying an image included in the RCS messaging session, information identifying the user, information identifying the chatbot, or information identifying the other application included on the device.

17. The method of claim 15, wherein the shortcut associated with the RCS messaging session includes at least one of:

an icon displayed on the home screen of the device, a hyperlink displayed on the home screen of the device, or a notification displayed on the lock screen of the device.

18. The method of claim 15, further comprising:

receiving, after generating the snapshot of the RCS messaging session, other additional information associated with the RCS messaging session, wherein the other additional information associated with the RCS messaging session is received while the RCS messaging session is idle; and based on receiving the additional information:

transmitting, to the application server, the other additional information and an instruction to store the other additional information in the snapshot of the RCS messaging session, and displaying, on the display of the device, a notification associated with the other additional information.

19. The method of claim 15, further comprising:

receiving an input associated with a user interaction with the shortcut associated with the RCS messaging session;

obtaining, based on receiving the input, the snapshot of the RCS messaging session from the application server; and displaying, on the display of the device, the snapshot of the RCS messaging session in the RCS application.

20. The method of claim 15, further comprising:

receiving, while the RCS messaging session is active, other additional information associated with the RCS messaging session;

receiving another instruction to generate another shortcut associated with the RCS messaging session, generating, based on receiving the other instruction, an updated snapshot of the RCS messaging session, wherein the updated snapshot of the RCS messaging session includes:

information included in the snapshot of the RCS messaging session, and the other additional information associated with the RCS messaging session;

transmitting, based on generating the updated snapshot of the RCS messaging session, the updated snapshot of the RCS messaging session to the application server associated with the RCS application; and linking, based on transmitting the snapshot of the RCS messaging session to the application server, the shortcut associated with the RCS messaging session to the updated snapshot of the RCS messaging session.

* * * * *